United States Patent
Cherian et al.

(10) Patent No.: US 12,406,374 B2
(45) Date of Patent: Sep. 2, 2025

(54) DISCRIMINATIVE 3D SHAPE MODELING FOR FEW-SHOT INSTANCE SEGMENTATION

(71) Applicant: Mitsubishi Electric Research Laboratories, Inc., Cambridge, MA (US)

(72) Inventors: Anoop Cherian, Belmont, MA (US); Tim Marks, Newton, MA (US); Alan Sullivan, Middleton, MA (US)

(73) Assignee: Mitsubishi Electric Research Laboratories, Inc.

( * ) Notice: Subject to any disclaimer, the term of this patent is extended or adjusted under 35 U.S.C. 154(b) by 731 days.

(21) Appl. No.: 17/652,533

(22) Filed: Feb. 25, 2022

(65) Prior Publication Data

US 2023/0267614 A1 Aug. 24, 2023

Related U.S. Application Data

(60) Provisional application No. 63/268,398, filed on Feb. 23, 2022.

(51) Int. Cl.
*G06T 7/11* (2017.01)
*B25J 9/16* (2006.01)
(Continued)

(52) U.S. Cl.
CPC .............. *G06T 7/11* (2017.01); *B25J 9/1697* (2013.01); *G06T 7/155* (2017.01); *G06T 7/50* (2017.01);
(Continued)

(58) Field of Classification Search
CPC ... G06T 7/11; G06T 7/155; G06T 7/50; G06T 7/60; G06T 2207/10028;
(Continued)

(56) References Cited

U.S. PATENT DOCUMENTS 11,185,978 B2 * 11/2021 Jamali .................... B25J 13/084
11,794,343 B2 * 10/2023 Marthi ................... B25J 9/1676
(Continued)

OTHER PUBLICATIONS

Fernandez, R., Montes, H., Surdilovic, J., Surdilovic, D., Gonzalez-De-Santos, P., & Armada, M. (2018). Automatic detection of field-grown cucumbers for robotic harvesting. IEEE Access, 6, 35512-35527. (Year: 2018).*

(Continued)

*Primary Examiner* — Andrae S Allison
(74) *Attorney, Agent, or Firm* — Gene Vinokur

(57) ABSTRACT

An imaging controller is provided for segmenting instances from depth images including objects to be manipulated by a robot. The imaging controller includes an input interface configured to receive a depth image that includes objects, a memory configured to store instructions and a neural network trained to segment instances from the objects in the depth image, and a processor, coupled with the memory, configured to perform the instructions to segment a pickable instance using the trained neural network. The instructions include steps of selecting a tallest point in the depth image, defining a region using a shape such that the region surrounds the tallest point, sampling points in the region of the depth image, computing depth-geodesics between the tallest point and the sampled points, submitting the depth-geodesics to the neural network to segment the pickable instance among instances of the objects in the depth image, and an output interface configured to output a geometrical feature of the pickable instance to a manipulator controller of the robot.

20 Claims, 17 Drawing Sheets

(51) Int. Cl.
*G06T 7/155* (2017.01)
*G06T 7/50* (2017.01)
*G06T 7/60* (2017.01)

(52) U.S. Cl.
CPC ...... *G06T 7/60* (2013.01); *G06T 2207/10028* (2013.01); *G06T 2207/20081* (2013.01); *G06T 2207/20084* (2013.01); *G06T 2207/20152* (2013.01)

(58) Field of Classification Search
CPC . G06T 2207/20081; G06T 2207/20084; G06T 2207/20152; G06T 2207/30128; B25J 9/1697; G05B 2219/39484; G05B 2219/40053; G05B 2219/45063
See application file for complete search history.

(56) References Cited

U.S. PATENT DOCUMENTS

| | | | | |
|---|---|---|---|---|
| 11,845,191 | B1* | 12/2023 | Kuzhinjedathu | B23P 19/007 |
| 2018/0239957 | A1* | 8/2018 | Tang | G06T 7/543 |
| 2021/0407093 | A1* | 12/2021 | Ben Baruch | G06N 7/01 |
| 2022/0151500 | A1* | 5/2022 | Elbaz | G16H 50/50 |
| 2022/0309672 | A1* | 9/2022 | Cherian | G06N 3/045 |
| 2022/0366590 | A1* | 11/2022 | Satat | G06T 5/77 |
| 2023/0196735 | A1* | 6/2023 | Zhang | G06V 10/776 |
| | | | | 382/156 |
| 2023/0267614 | A1* | 8/2023 | Cherian | G06T 7/50 |
| | | | | 700/259 |
| 2023/0306718 | A1* | 9/2023 | Revaud | G06T 3/40 |
| 2023/0388470 | A1* | 11/2023 | Aluru | G06V 10/761 |
| 2024/0408766 | A1* | 12/2024 | Wiersma | G06V 10/82 |

OTHER PUBLICATIONS

Cherian, S. Jain, T. K. Marks and A. Sullivan, "Discriminative 3D Shape Modeling for Few-Shot Instance Segmentation," 2023 IEEE International Conference on Robotics and Automation (ICRA), London, United Kingdom, 2023, pp. 9296-9302 (Year: 2023).*

H. Song, Z. Liu, H. Du, G. Sun, O. Le Meur and T. Ren, "Depth-Aware Salient Object Detection and Segmentation via Multiscale Discriminative Saliency Fusion and Bootstrap Learning," in IEEE Transactions on Image Processing, vol. 26, No. 9, pp. 4204-4216, Sep. 2017, doi: 10.1109/TIP.2017.2711277. (Year: 2017).*

E. Martinson and V. Yalla, "Real-time human detection for robots using CNN with a feature-based layered pre-filter," 2016 25th IEEE International Symposium on Robot and Human Interactive Communication (RO-MAN), New York, NY, USA, 2016, pp. 1120-1125, (Year: 2016).*

J. Yang, Y. Gao, D. Li and S. L. Waslander, "ROBI: A Multi-View Dataset for Reflective Objects in Robotic Bin-Picking," 2021 IEEE/RSJ International Conference on Intelligent Robots and Systems (IROS), Prague, Czech Republic, 2021, pp. 9788-9795, (Year: 2021).*

A. Ramisa, G. Alenyà, F. Moreno-Noguer and C. Torras, "Using depth and appearance features for informed robot grasping of highly wrinkled clothes," 2012 IEEE International Conference on Robotics and Automation, Saint Paul, MN, USA, 2012, (Year: 2012).*

* cited by examiner

| Method | Precision | Recall | F1 |
|---|---|---|---|
| Multilayer Perceptron (MLP) | 82.2 | 82.9 | 82.3 |
| Linear SVM | 74.4 | 68.8 | 70.9 |
| RBF SVM | 79.2 | 81.8 | 80.3 |
| Geodesic K-Means | 65.9 | 73.3 | 69.3 |

FIG. 8

| Method | Single Inst. | | | Multi-Inst. | | |
|---|---|---|---|---|---|---|
| | Prec. | Recall | F1 | Prec. | Recall | F1 |
| Nuggets | 89.3 | 91.3 | 90.7 | 91.6 | 92.8 | 92.2 |
| Fried Food | 92.4 | 94.6 | 93.5 | 92.7 | 93.8 | 93.2 |
| Cut Carrot | 88.6 | 85.1 | 86.3 | 87.4 | 87.3 | 86.8 |
| Taro | 95.4 | 94.0 | 94.6 | 96.3 | 94.9 | 95.6 |

FIG. 10

Qualitative instance segmentations produced by our method on the cut carrot instances.

Qualitative instance segmentations produced by our method on the chicken nuggets instances.

Qualitative instance segmentations produced by our method on taro instances.

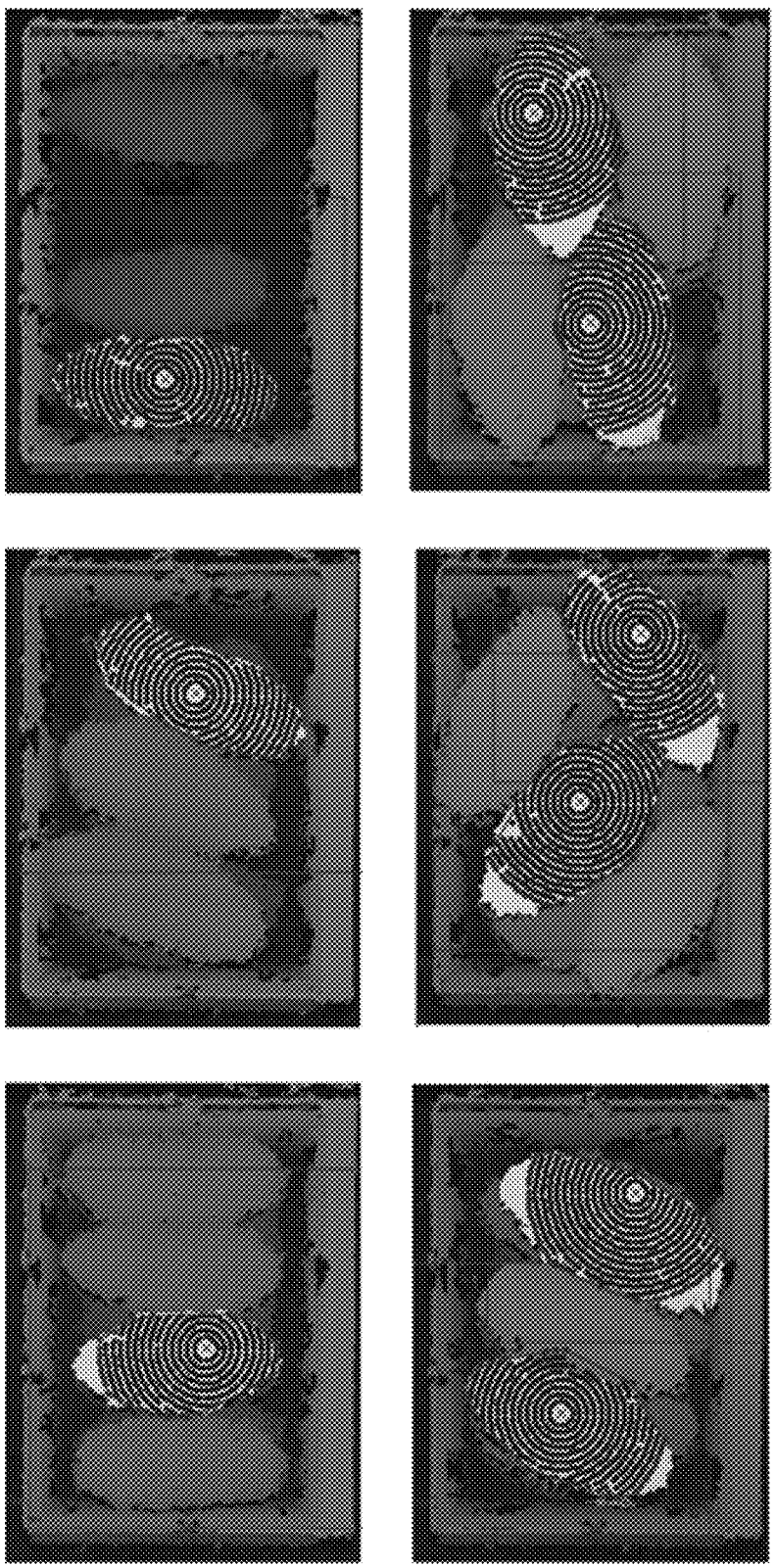
FIG. 11D Qualitative instance segmentations produced by our method on the fried food instances.

DISCRIMINATIVE 3D SHAPE MODELING FOR FEW-SHOT INSTANCE SEGMENTATION

FIELD

The present disclosure relates generally to automatically segmenting multiple instances of an object in depth images, while the segmentation model is trained in a few-shot setting using only a few annotated training examples.

BACKGROUND

Instance segmentation is an essential step in a variety of autonomous tasks. Some examples include: (i) a robotic arm that needs to pick similar products moving on a conveyor belt in a manufacturing setting, (ii) a supermarket robot that needs to pick and place fruits from a bin, (iii) a library-assistant robot that needs to pick and handover books from a box to a human, (iv) identifying instances of a car on the road in an automated driving setting, or (v) identifying instances of an body tissue in medical images for automated diagnosis.

Standard deep learning solutions, e.g., Mask-RCNN and variants for solving such instance segmentation tasks, typically need a large training set for training the underlying neural networks, however creating such training sets and annotating the training examples could be expensive and will involve significant physical labor. Thus, creation of such datasets may not be feasible in many situations. The instance segmentation task could also be considered as one of applying standard clustering schemes on the depth image point clouds. For example, segmentations could be derived from applying K-Means, Guassian mixture modeling, or spectral clustering on the point clouds. However, such clustering algorithms usually make assumptions on the point cloud distributions and thus may not be flexible to segment real world objects whose shapes may be varied. There are also recent approaches such as InSeGAN that can produce instance segmentations in an unsupervised setting. However, InSeGAN requires large unlabelled training sets with diversity in the instance arrangements, which may also be difficult to obtain in real-world conditions.

Therefore, there is a need for designing an approach for instance segmentation that could automatically segment multiple instances of an object in depth images, and which needs only very few training examples to training the segmentation model.

SUMMARY OF THE INVENTION

The present disclosure relates generally to automatically segmenting multiple instances of an object in depth images, while the segmentation model is trained in a few-shot setting using only a few annotated training examples.

Some embodiments of the present disclosure provide a method for segmenting object instances in depth images. In contrast to prior methods that typically use a deep neural network for the segmentation, the present disclosure includes a uniquely created instance segmentation pipeline that does not need any 3D CAD models of the objects, instead requires only very few annotated examples of the object instances in a few depth images.

The embodiments of the present disclosure are configured for automatically segmenting multiple instances of an approximately-convex 3D object in depth images in a few-shot setting, which is a novel approach in computer vision domain. The embodiments in the present disclosure can be configured to perform for a number of applications including robot-assistive tasks. For example, to pick an object from a bin containing multiple instances, for which a robot needs to segment the instances correctly to plan a grasp.

Some embodiments of the present disclosure include an architecture for instance segmentation that follows some aspects of the deep neural networks, however, standard neural networks need large training sets of annotated instances in depth images for training. A key insight in the present disclosure is to not use the instances directly for training the neural network, instead to train the neural network to classify depth surface geodesics connecting pairs of three-dimensional points in the depth image. As there are quadratically-many such pairs of points possible for the number of pixels in the depth image, a small number of annotated instances can produce a large collection of annotated surface geodesics, that can then be used to train the neural network. The method first selects random samples of spatial locations in the given training depth images, and compute pairwise surface geodesics between every pair.

At least one realization gained from experimentation is that the surface geodesics computed between pairs of depth points can be of arbitrary length and thus could be difficult to be used to train a neural network that expects a fixed sized input. To this end, the presented model discretizes each geodesic into a fixed dimensional vector. In the present disclosure, each geodesic is divided into equal segments, and each dimension of the discretized geodesic vector is filled with the depth of the pixel at the end point of the respective geodesic segment.

Another realization for the present disclosure is gained from the theoretical insight that for any two points on a convex surface, a surface geodesic (which is a shortest curve) connecting these two points will have a convex shape. However, if the two points belong to different instances, and each instance is a convex shape, then a surface geodesic connecting the two points will have a non-convex shape or discontinuity at depth point where the two object surfaces intersect. These two types of curves (convex and non-convex) are used to train the neural network for a classification objective. The neural network when well-trained will classify each geodesic to be entirely within an instance segment (convex geodesics) or crosses over multiple instances (non-convex geodesics).

A realization gained from experimentation is that with the discretization of the surface geodesics, the convex/non-convex discontinuities in the geodesics may be lost if the two instances across which the curves are computed is very close. For, example, consider two cubes touching each other. In the depth image, at locations where the cubes touch, the curve may be almost continuous, and the discontinuity may be skipped by the discretization step when the number of dimensions in the fixed dimensional geodesic vector is not many to capture the discontinuity. A similar problem can happen when there is noise in the depth images, as a result, the standard noise removal and hole-filling algorithms typically used in smoothing the depth images may over-smoothen the boundary of the instance segments, and thus the ground truth geodesic discontinuities may be suppressed. To circumvent this issue, the training annotations for the instances are deployed. The annotations guide the neural network for classification even when the discretized geodesic vector has suppressed the object intersection discontinuities, and thereby requires the neural network to learn other surface features that characterize the surface of the 3D objects.

Another realization gained from experimentation is that a random selection of pairs of points from the depth image to construct the geodesics to train the neural network can be sub-optimal. For example, there could be geodesics that are very easy for the neural network to learn to segment, however there can be other geodesics that are hard to be classified. As the easy examples could sometimes be significantly more than the hard examples, the neural network training could be biased, and may not produce the correct segmentation for difficult segmentation scenarios. Another scenario is when the size of the objects to be segmented are small, however there are many instances in the given depth images. This results in a large collection of geodesics that go across multiple instances, while only a few geodesics that are entirely within the instances. To fix these issues, the present disclosure proposes to create an initial segmentation of the depth image using the Watershed Algorithm (WA). The method in WA produces two outputs: (i) a set of peaks, which are points in the depth image that are purported to correspond to the centroid of an instance, and (ii) a segmentation of the respective instance. However, as the WA method is unsupervised, the peaks or the segmentation it produces can be inaccurate. A key insight in the present disclosure is to improve the WA segmentation using the ground truth training annotations, and the geodesic classification neural network. More clearly, one end of the geodesics is taken from the peaks produced by WA, and the other end of the geodesics are constrained to be within the respective segment produced by WA for that corresponding selected peak. Next, the geodesics are given labels using the ground truth annotation as to whether the geodesic belongs entirely to the same instance. If the WA made a mistake in segmenting the instance, then the ground truth instance labeling of the geodesic will make the neural network to correct this mistake, leading to a better instance segmentation. At least one benefit of the selection of the geodesics from within the instances produced by WA is that it allows for creating a better training set for the neural network that has more geodesics belonging to the same instance as well as hard examples produced by incorrect segmentations by WA. The geodesics belonging to the same instances allow for learning a better implicit 3D model of the object shape within the neural network, while the hard examples allow for learning a discriminative network that works well with challenging segmentation scenarios.

When using the trained model for instance segmentation, the architecture takes as input a depth image, on which the depth geodesics are computed between selected pairs of locations in the depth image. The locations are selected based on pre-decided practical criteria. One embodiment of this criteria is based on the subsequent task the segmentations are used for. For example, if the instance segmentation produced by the approach is used to pick the instances by a robotic arm, then it is useful if the top-most instances in the pile of instances are segmented first. Such instances that are desired to be segmented first are called pickable instances.

The present disclosure proposes to select pairs of spatial locations on the depth image to compute the depth geodesics on the input test image, where the selection is based on the pickable instance in a given test depth image. The depth geodesics are computed between all pairs of locations selected. One end of each geodesic is fixed on the tallest depth point on the pickable instance. This point is called the seed point. The other end of the geodesic is selected from a region around the tallest depth point and within a pre-defined radius. Each geodesic is discretized as described in the training phase. The pre-trained neural network then classifies each geodesic as entirely belonging to one instance surface or spans across more than one instance. A convex hull of all the points that are classified as belonging to the same instance is then used to define the instance segment. The process is repeated for various selected locations in the image to produce multiple such instance segmentations.

A realization from experimentation for segmenting a given test image is that a random selection depth points from around the seed point may not be efficient computationally as it may not cover the instance in all directions. This insight suggests for a systematic selection of points around the seed point. An embodiment of this idea in the present disclosure is to create the sample set of points around the seed point on concentric circles along angularly equi-spaced radial lines. Such a selection allows for uniformly covering a circular region around the seed point to construct the geodesics, A realization that comes up with the way the test geodesics are constructed is that these geodesics are always directed from depth points that are higher to points that are lower. Thus, it may be inefficient to include geodesics in the training set that does not adhere to this property. To fix this, the depth points used for training the neural network are first sorted in the ascending order of their depth, and the geodesics for training are computed from points that have lower depth (or tallest points) to points that have higher depths.

The embodiments of the present disclosure provide an imaging controller for segmenting instances from depth images including objects to be manipulated by a robot. The image controller may include an input interface configured to receive a depth image that includes objects; a memory configured to store instructions and a neural network trained to segment instances from the objects in the depth image; and a processor, coupled with the memory, configured to perform the instructions to segment a pickable instance using the trained neural network, wherein steps of the instructions comprise: selecting a tallest point among all instances in the depth image; defining a region using a shape such that the region surrounds the tallest point; sampling points in the region of the depth image; computing depth-geodesics between the tallest point and the sampled points; submitting the depth-geodesics to the neural network to segment the pickable instance among instances of the objects in the depth image; and an output interface configured to output a geometrical feature of the pickable instance to a manipulator controller of the robot.

Further, according to some embodiments of the present invention, a computer-implemented method is provided for training a neural network for segmenting instances in depth images. In this case, the method uses a processor coupled with stored instructions implementing the method, wherein the instructions, when executed by the processor carry out the steps of the method, comprising steps of: selecting a depth image from a set of depth images; determining points of xy spatial locations on a 2-dimensional image grid and corresponding depth points with respect to the selected depth image, wherein the points on the 2-dimensional image grid are respectively annotated with ground truth instance labels; computing geodesic straight lines between pairs of the annotated determined points; generating depth geodesics by projecting the geodesic straight lines on the depth image; discretizing each of the depth geodesics to create discretized vectors, wherein each discretized vector corresponds to one of the depth geodesics between a pair of the annotated determined points; and submitting the discretized vectors and corresponding annotated labels of the discretized vectors to the neural network, wherein the steps from the selecting through the providing are repeatedly performed until rest of all the set of depth images are used.

Yet, further, according to some embodiments of the present invention, a bin picking system is provided for piking objects from a bin. The bin picking system may include an end-tool configured to pickup an object from among the objects; a robot arm including the end-tool, wherein the robot arm is configured to be driven by control signals that include end-tool signals to pickup the object from the bin using the end-tool; an interface configured to transmit and receive the control signals, sensor signals of sensors arranged on the robot arm, imaging signals of at least one imaging device; a memory configured to store instructions of a robot control program, and a classifier and a trained neural network that segments instances from the objects in the depth image, the trained neural network having been trained by a computer-implemented method mentioned above; and a processor, coupled with the memory, configured to perform the instructions to segment a pickable instance using the trained neural network and generate the control signals that drive the robot arm and the end-tool, wherein steps of the instructions comprise: selecting a tallest point in the depth image; defining a region using a shape such that the region surrounds the tallest point; sampling points in the region of the depth image; computing depth-geodesics between the tallest point and the sampled points; submitting the depth-geodesics to the neural network to segment the pickable instance among instances of the objects in the depth image; generating a geometrical feature of the pickable instance and the control signals based on the imaging signals; and transmitting the generated geometrical feature and generated control signals to the robot arm such that the end-tool pickups an object corresponding to the pickable instance from the bin using the end-tool.

Thus, the systems and methods as a whole cannot be viewed merely as performing aspects in the human mind, nor gathering (collecting) data, processing data, analyzing data, and displaying certain results, in terms of being abstract. In contrast, the systems and methods can generalize when annotation is difficult, or when operating in a complex scene at less expense and computational expense and can be competitive and profitable for participants in the computer vision industry and other industries.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 8 shows comparison of results obtained by the present invention and other approaches for Fried Chicken dataset;

FIG. 10 is an example showing the segmentation result using the dataset of FIG. 9, according to embodiments of the present invention;

FIGS. 11A, 11B, 11C and 11D show several examples of segmentations produced by our setup on cut carrots, chicken nuggets, taro and fried food instances, according to embodiments of the present invention;

DETAILED DESCRIPTION

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

Segmenting nearly-identical object instances is a problem that is ubiquitous in a variety of robotic bin-picking applications. Some examples include: (i) a robotic arm that needs to pick products moving on a conveyor belt in a manufacturing setting, (ii) a supermarket robot that needs to pick and place fruits from a bin, or (iii) a library-assistant robot that needs to pick and handover books from a box to a human.

Figures 1A, 1B:
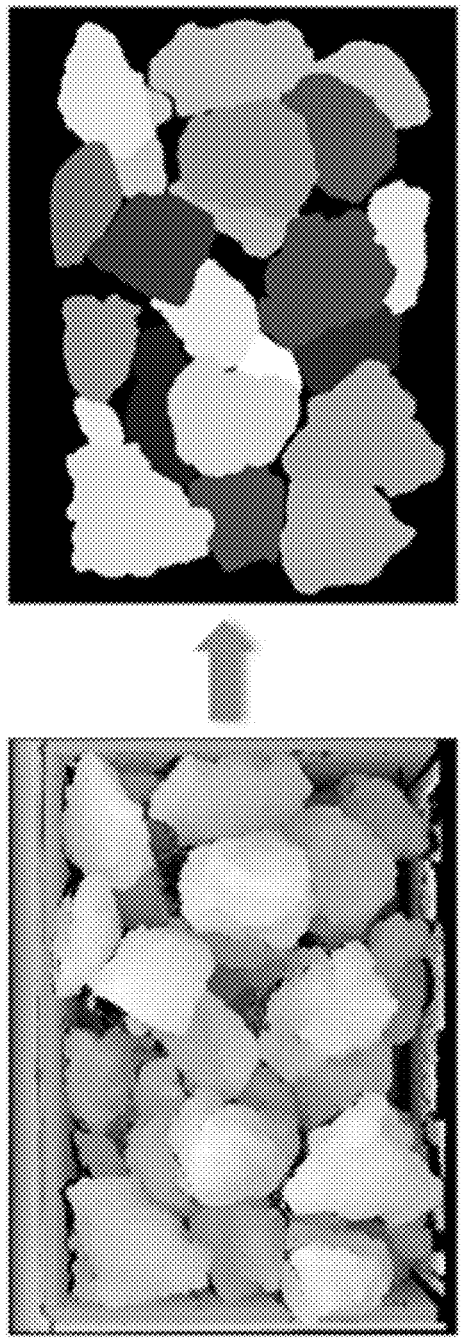
FIGS. 1A and 1B are for an illustrative example of depth image segmentations of nearly-identical chicken nuggets instances in a bin, according to embodiments of the present invention.

FIG. 1A and FIG. 1B are for an illustrative example of depth image segmentations of nearly-identical chicken nuggets instances in a bin according to some embodiments of the present invention. See FIG. 1A for an illustrative example of depth image segmentations of nearly-identical chicken nuggets instances in a bin. Standard deep learning solutions for this task would need a large training set and significant annotation efforts. One could also consider this problem as one of applying standard clustering schemes on the depth points. For example, segmentations could be derived from say applying K-Means, EM, or spectral clustering on the point cloud. However, such clustering algorithms usually make assumptions on the shape of the distributions or involve hyperparameters. For example, K-Means assumes the distributions are spherical around the cluster centroids, or ellipsoidal as in EM. Spectral clustering requires specifying proximity hyperparameters to define the edges of the underlying graph Laplacian. There are also some recent approaches for unsupervised instance segmentation. However, they require large unlabelled training sets with diversity in the instance arrangements, which may also be difficult to obtain in real-world conditions. For example, some methods need thousands of unlabelled depth images, which requires a robotic arm to shake a bin of objects-a task that is unscalable, and sometimes infeasible if the objects that one is interested in are fragile or could be damaged with such shaking.

In the present disclosure, we consider this problem of instance segmentation of nearly-identical convex object instances in depth images in a few-shot setting, where we assume to have access to a limited set (less than five) of annotated depth images, each with a few instances being annotated with their segments. Our key idea is to create surface trajectories or geodesics on the 3D surface of the depth image, with the goal of training a neural network to classify these trajectories as being within or across two ground truth instances; the network thus potentially learning an implicit 3D model of a single object instance within its parameters, even if it is trained using only single geodesic trajectories. For a depth image with n pixels, there are $n(n-1)/2$ such geodesics potentially possible, which if carefully used could provide a significantly large dataset to train. Our idea is to leverage this insight towards instance segmentation, when the number of images annotated is very few. Specifically, our algorithm has the following steps. (i) For two randomly chosen points on the depth image, we compute a surface geodesic that is the projection of a straight line connecting the two points on the 2D RGB image grid onto the depth image. Given that the objects we assume are convex (and the camera plane is assumed orthogonal to the objects), this projection will be (approximately) a shortest path connecting the two points on the object's depth surface, and thus will be a depth geodesic. (ii) We discretize this geodesic into a pre-defined (fixed) set of bins, where each bin will hold the value of the depth of the geodesic at that bin location. The bins are equally-spaced on the straight line from which the geodesic was projected from. (iii) Next, we give a label to the geodesic using the ground truth segments provided. Specifically, if the two ends of the geodesic belong to the same object instance, then we give a label 1 to the discretized geodesic vector, and zero otherwise. (iv) We train a neural network classifier on these discrete vectors and their labels.

At test time, given a depth image, we first select a seed location in the depth image to start the segmentation process. In robotic bin-picking applications, it is usually easier for the robot to pick an instance that is located at the very top (i.e., closest to the robot). In some other cases, an instance that is most-isolated, may be preferable. We propose various heuristics to compute this initial seed. Next, we compute geodesics from this seed point to random spatial locations around the seed point and within a predefined radius. We discretize these geodesics, and classify each geodesic as belonging to the same instance or not using the pre-trained classifier. For all the points that are classified as being within the same instance, we compute a convex hull of these points, and consider all the pixels within this hull as corresponding to the same instance, thus achieving instance segmentation. To create segmentations for more than one instance, we select another seed point from the depth image that is outside a predefined proximity of the already segmented instance, and repeat the above process until we have obtained a suitable number of object instances for the task.

Proposed Method

Suppose we are given a set of annotated depth images $D=\{D_1, D_2, \ldots, D_N\}$ where each $D \in \mathbb{R}_+^{H \times W}$ defines an image grid of width W and height H pixels, such that $D_{xy}$ holds a non-negative value corresponding to the depth of the scene at location $(x, y) \in [H] \times [W]$, for $[Z]$ denoting the index set of integers $\{0, 1, \ldots, Z-1\}$. For a pixel $(x, y)$ on the image grid, we assume it is annotated with an instance label $l_{xy} \in [L_D] \cup \{L_B\}$, where $L_D$ is the number of instances in the depth image D, and $L_B$ corresponds to a background label (i.e., a pixel that does not contain the depth of any object instance, such as the pixels for the base of the bin, the walls of the bin, etc.). To introduce our method, we will need some background notation, which we describe next.

Surface Geodesics and Assumptions

For two distinct points $(x_1, y_1)$ and $(x_2, y_2)$ on the image grid, suppose $\gamma(t)$ (for $t \in [0,1]$) be the directed surface curve starting at $D_{x_1y_1}$ and ending at $D_{x_2y_2}$. That is, $\gamma(0) = D_{x_1y_1}$, and $\gamma(1) = D_{x_2y_2}$, with all its points $\gamma(t) \in D$, $\forall t \in [0,1]$. We define $$L(\gamma) = \int_{x_1y_1}^{x_2y_2} \sqrt{D_\gamma(t)(\dot{\gamma}(t), \dot{\gamma}(t))}\, dt$$

as the length of this curve $\gamma$, and a geodesic g is a curve (or set of curves) with the minimal length connecting the two points. That is, $$g \in \inf_\gamma L(\gamma).$$

We call the geodesic as a z-geodesic as well in the subsequent text. To derive our method, we make the following assumptions on our problem setting.

Assumption 1 (Surface Convexity) We assume the objects used in our setup are convex and the depth patch associated with the instances form an approximately convex smooth surface.

By convex object surfaces, we mean that all the one-dimensional curves $\gamma(t)$ on the surface are convex with respect to t such that any $\gamma(t) \leq (1-t)\gamma(0) + t\gamma(1)$, $\forall t \in [0,1]$. Suppose $D_l^S \subset D$ is a patch from the depth image D where all the elements in $D_l^S$ have the same instance label l. Then, for two distinct points $(x_1, y_1)$, $(x_2, y_2)$ on the image grid where both $D_{x_1y_1}$, $D_{x_2y_2} \in D_l^S$, if $g_{x_1y_1}^{x_2y_2}(t)$ is a geodesic starting at $g_{x_1y_1}^{x_2y_2}(0) = (x_1, y_1)$ and ending at $g_{x_1y_1}^{x_2y_2}(1) = (x_2, y_2)$, and if label denotes the instance label of the point $g_{x_1y_1}^{x_2y_2}(t)$ on the geodesic, then we have the following proposition that is straightforward to prove using the basic properties of convexity. We will omit the subscripts and superscripts on $g_{x_1y_1}^{x_2y_2}(t)$ for now to simplify our notation, we will revert to it whenever required.

Proposition 1 If $D_l^S$ is a convex depth patch from a depth map D, and if $g(t)$ is a geodesic from $g(0)=(x_1, y_1) \in D_l^S$ to $g(1)=(x_2, y_2) \in D_l^S$, then $$\text{label}(g(t)) = l, \forall t \in [0,1]. \tag{1}$$

Assumption 2 (Orthogonal Projection) The camera projection plane is located suitably far from the instances, such that the image XY-plane is approximately orthogonal to the velocity $\dot{\gamma}(t)$ of any trajectory on the depth surface.

This assumption allows us to parameterize the geodesic $g_{x_1y_1}^{x_2y_2}(t)$ connecting 3D points $p_1=(x_1, y_1, g_{x_1y_1}^{x_2y_2}(0))$ and $p_2=(x_2, y_2, g_{x_1y_1}^{x_2y_2}(1))$ by the straight line $e_{x_1y_1}^{x_2y_2}(t)$ for $xy(t)=(1-t)(x_1, y_1)+t(x_2, y_2)$ for $t\in[0,1]$. We will use $e(xy(t))$ to denote $e_{x_1y_1}^{x_2y_2}(t)$ for simplicity, and with this parameterization, we have the geodesic as $g(e(xy(t)))$, where now instead of t, we use the points on the straight line to index depth.

Assumption 3 (Stationary Pose) We further assume that the camera location and pose, as well as the bin are stationary when capturing all the depth images.

We also assume that there is one or more instances of the object in the bin in the training images and that all the instances are of the same object. We do not make any assumption on either the arrangements of the instances in the bin or on the number of instances in the bin. We also assume that the ground truth annotations are reasonably accurate, and at least one instance in each training image is associated with a ground truth annotation. While, we may have access to RGB images of the bin alongside the depth images, we do not use these RGB images in our approach described in this work. Further, one could also easily extend the approach to work with depth point clouds, instead of depth images. In this case, the geodesic approximation using Assumption 2 may not be applicable directly as the XY points may not be described by a fixed image grid anymore.

Discriminative Shape Modeling

Figures 2A, 2B:
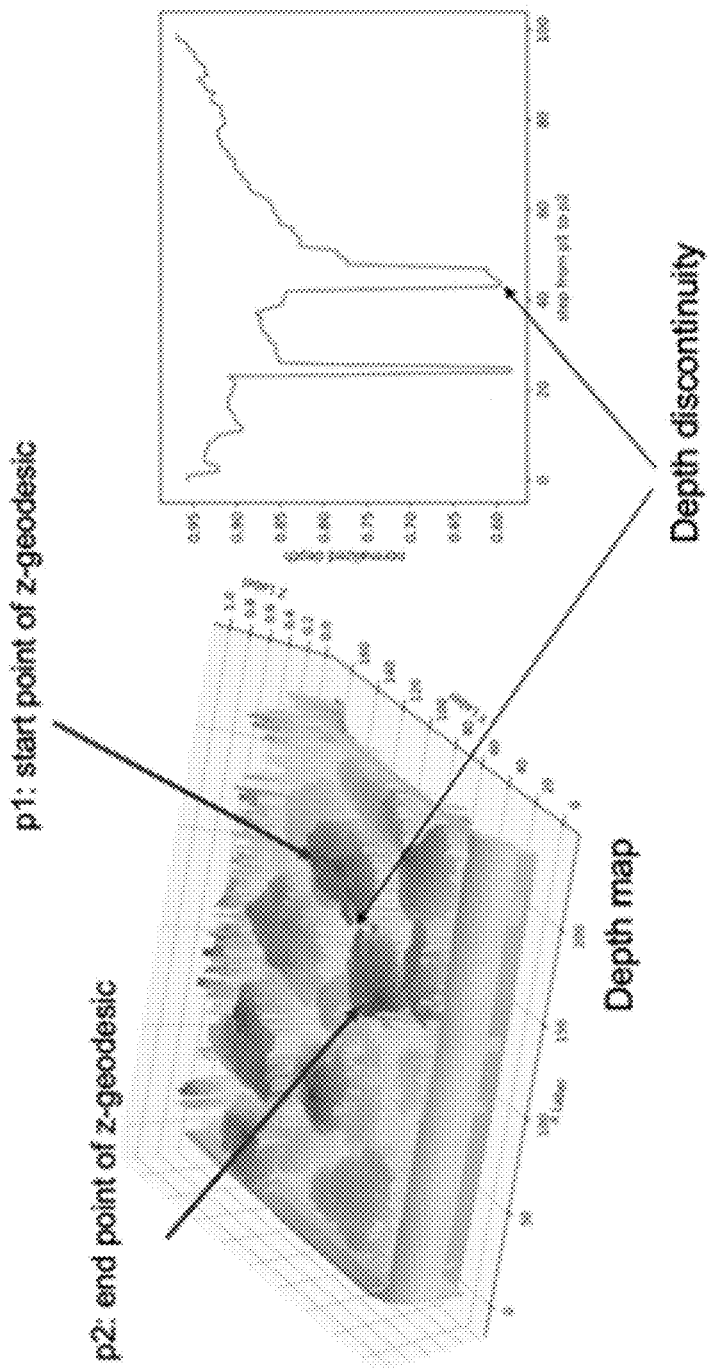
FIG. 2A shows an example illustrating a depth image containing multiple instances of an object, according to embodiments of the present invention.
FIG. 2B show the surface curve between two arbitrary points $p_1$ and $p_2$ in FIG. 2A, according to embodiments of the present invention.

FIG. 2A and FIG. 2B show a depth image containing multiple instances of an object, and the surface curve between two arbitrary points $p_1$ and $p_2$. FIG. 2B plots this curve as a one-dimensional curve $g(t)$ for varying t, where the X-axis of the plot shows t varied from t=0 corresponding to point p1 to t=1 corresponding to point p2 in 100 equal steps, and the Y-axis shows the depth of the geodesic in the depth image for the corresponding value of t. Our key insight to develop our approach is that if the two ends of this curve belong to different instances, then this curve will be non-convex or non-smooth at the points where the instances overlap. Our approach attempts to leverage this insight into learning the implicit object shapes using a neural network. In the following, we describe each step in our setup in detail. Before we proceed, we need to discuss a few practical choices that need to be considered from a computational and implementation perspective.

Geodesic Discretization: From a practical sense, directly applying the idea of using the geodesics for instance segmentation is problematic, as in that case, one would need an implicit paramtrization of the surface geodesics as continuous curves, which may be difficult for arbitrary curves and objects for which there may not be any analytical form for such curves (e.g., a surface geodesic on a chicken nugget?). Instead, to keep things computationally cheap, we discretize the curves using a fixed number of bins. Specifically, for a geodesic $g(t)$, we represent it using a fixed m-dimensional vector $v\in\mathbb{R}_+^m$ where the k-th dimension $v_k=g((k-1)/m)$. Such discretized geodesics can be computed very cheaply using the Assumption 2 of orthogonal projection of the camera plane, as in that case, one just, needs to first split the Euclidean geodesic approximation $e_{x_1y_1}^{x_2y_2}(t)$ to m parts, i.e., $xy(k)=e_{x_1y_1}^{x_2y_2}((k-1)/m)$ to obtain the (x, y) 2D image grid location, which can then be used to directly index the depth map to get $v_k=D_{xy(k)}$.

Instance Supervision: If the discontinuities or non-convexity of the surface geodesics are sufficient to find the instance boundaries, then why would one need instance annotations? This is because, the above discretization step may skip discontinuities in the curve if the two instances are very close. For example, consider two cubes, touching each other. In the depth image, at locations where the cubes touch, the curve may be almost continuous, and the discontinuity may be skipped by the discretization step. A similar problem can happen when there is noise in the depth images that standard noise removal and hole-filling algorithms may smooth the depth images that the ground truth geodesic discontinuities may be suppressed. To circumvent these issues, the present method of the assume to have access to ground truth instance masks.

Instance Segmentation Training Pipeline

Figure 3:
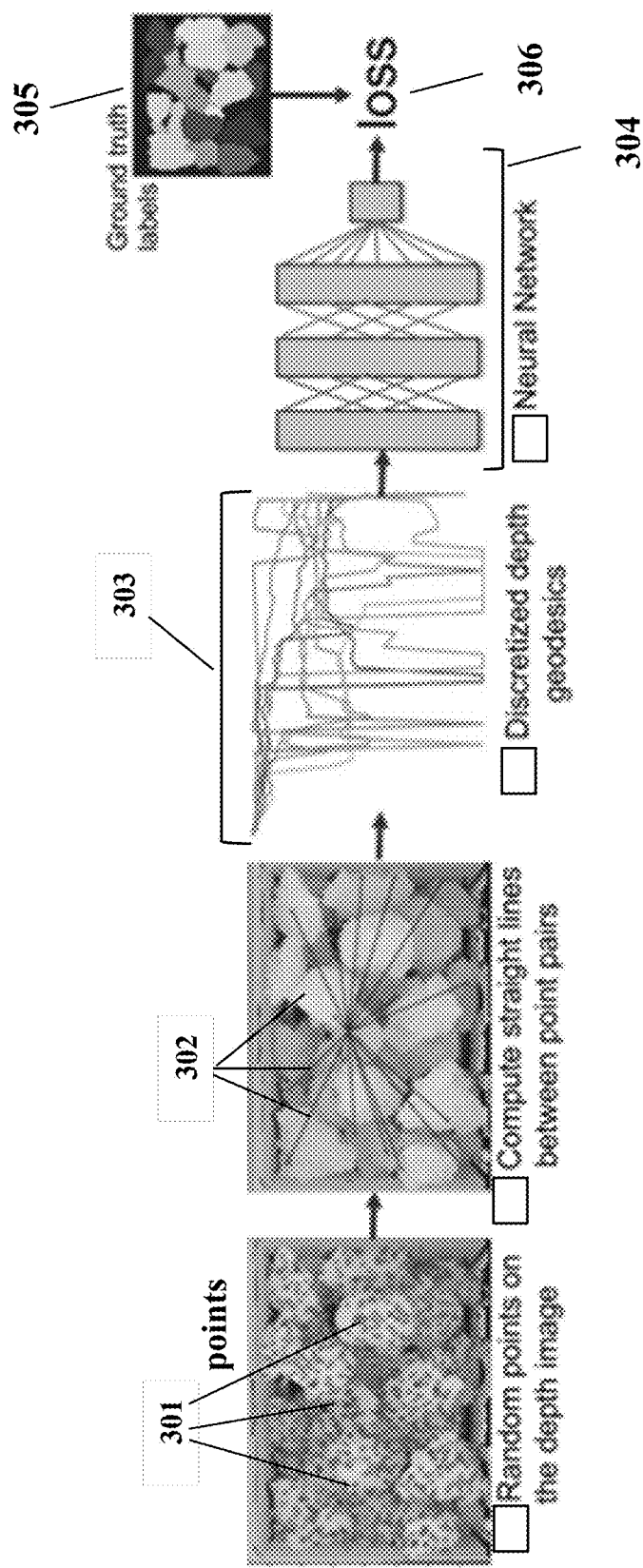
FIG. 3 illustrates a pipeline training a neural network to learn the implicit shape model of a single instance of the object using surface geodesics, according to embodiments of the present invention.

FIG. 3 shows an example of a training pipeline according to some embodiments of the present invention for computing the surface geodesics on a given training depth image, and to train the neural network. For a given training depth image D, the first step in our pipeline is to select a random set of M points 301 on the 2D image grid. Let us call this set $P=\{(x_1, y_1), (x_2, y_2), \ldots, (x_M, y_M)\}$. Next, for every pair of such points $(x_i, y_i), (x_j, y_j)\in P$, we compute the Euclidean (geodesic) straight lines $e_{x_iy_i}^{x_jy_j}(t)$ 302 (one such point and its straight lines to a couple of other points are only shown in FIG. 3). This step is followed by computing the depth geodesics $g_{x_iy_i}^{x_jy_j}(t)$ on the depth image by projecting these Euclidean geodesics on the depth map. Each depth geodesic is then discretized into m bins forming the set $V=\{v_1, v_2, \ldots, v_M\}$ of M vectors as described in the above section, each v corresponding to a discretized depth geodesic 303. Suppose $v:=v_{x_iy_i}^{x_jy_j}\in V$ is such a discretized vector corresponding to a depth geodesic from point $(x_i, y_i)$ to $(x_j, y_j)$, then we assign a label $label_g$ to v as:

$$\mathrm{label}_g\left(v_{x_iy_i}^{x_jy_j}\right) = \begin{cases} 1, & \text{if } \ell_{x_iy_i} = \ell_{x_jy_j}, \\ 0, & \text{Otherwise.} \end{cases} \quad (2)$$

Recall that $l_{xy}$ is the instance label associated with the image point (x, y).

Our final step in the training pipeline is to use the set V and its corresponding binary labels to train a neural network model $f_\theta: V\to\{0,1\}$, parametrized by $\theta$. Specifically, the neural network 304 is a series of multi-layer perceptrons (MLP), and takes as input a batch of samples from V and predicts the label of the respective sample. This prediction is then matched with the ground truth binary label 305 using the softmax-crossentropy loss 306, which is then used to derive a gradient to train the network parameters. In our experiments, we found that augmenting each vector $v\in V$ with the length of the Euclidean geodesic $\int_0^1 e_{x_iy_i}^{x_jy_j}(t)\, dt=|(x_i, y_i)-(x_j, y_j)|$ (i.e., adding an extra (m+1)-th dimension to v with this length) improves the training and performance of the network. This is because, for situations when there are no discontinuities in the geodesics that the network can discern, it can learn an approximate size of the underlying shape for classification.

Instance Segmentation Inference Pipeline

Figures 4A, 4B:
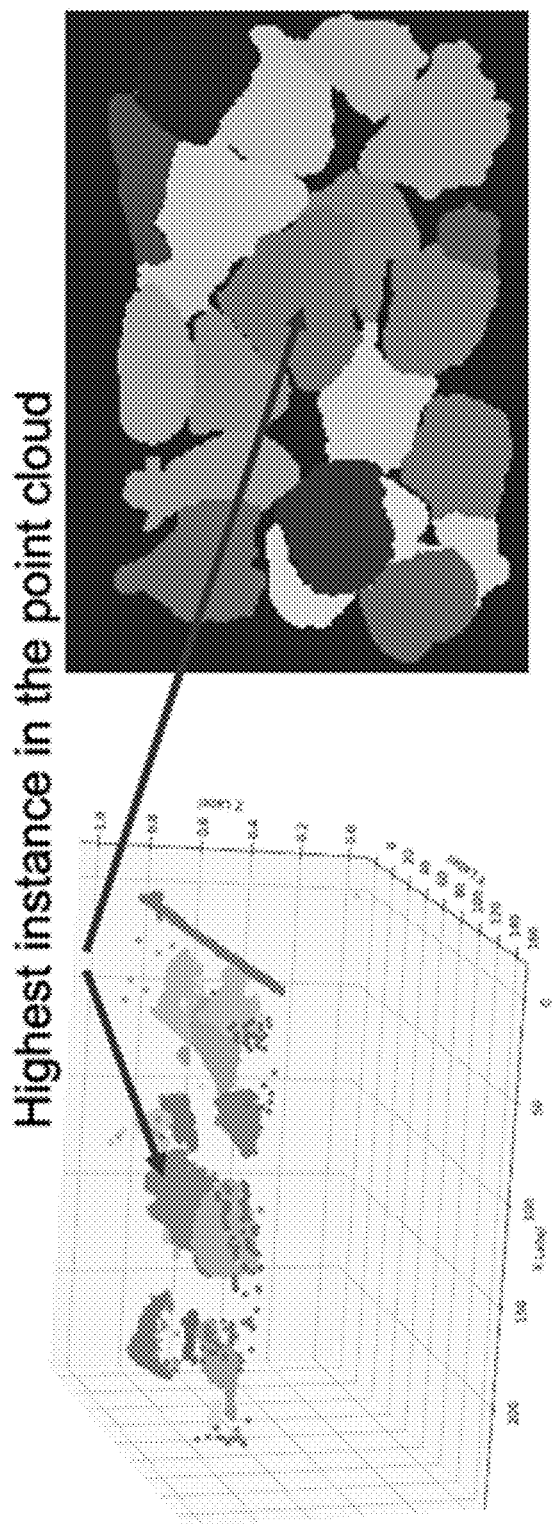
FIG. 4A shows an example illustrating a pickable instance in the depth point cloud, according to embodiments of the present invention.
FIG. 4B shows the segment instances that are at the top of the bin in FIG. 4A, according to embodiments of the present invention.

FIG. 4A shows an example illustrating a pickable instance in the depth point cloud, and FIG. 4B shows the segment instances that are at the top of the bin in FIG. 4A, according to embodiments of the present invention.

At test time, given a test depth image D, our goal is to repeat the process during the training phase for instance segmentation. As our goal is finally to produce a segmentation for an instance in the bin that is perhaps most useful for a robotic arm to grasp and pick, we propose to segment instances that are at the top of the bin (i.e., those instances closest to the camera) as shown in FIG. 4A and FIG. 4B, with the goal of generating its instance segmentation mask first. We call such an instance as a pickable instance.

Figure 5:
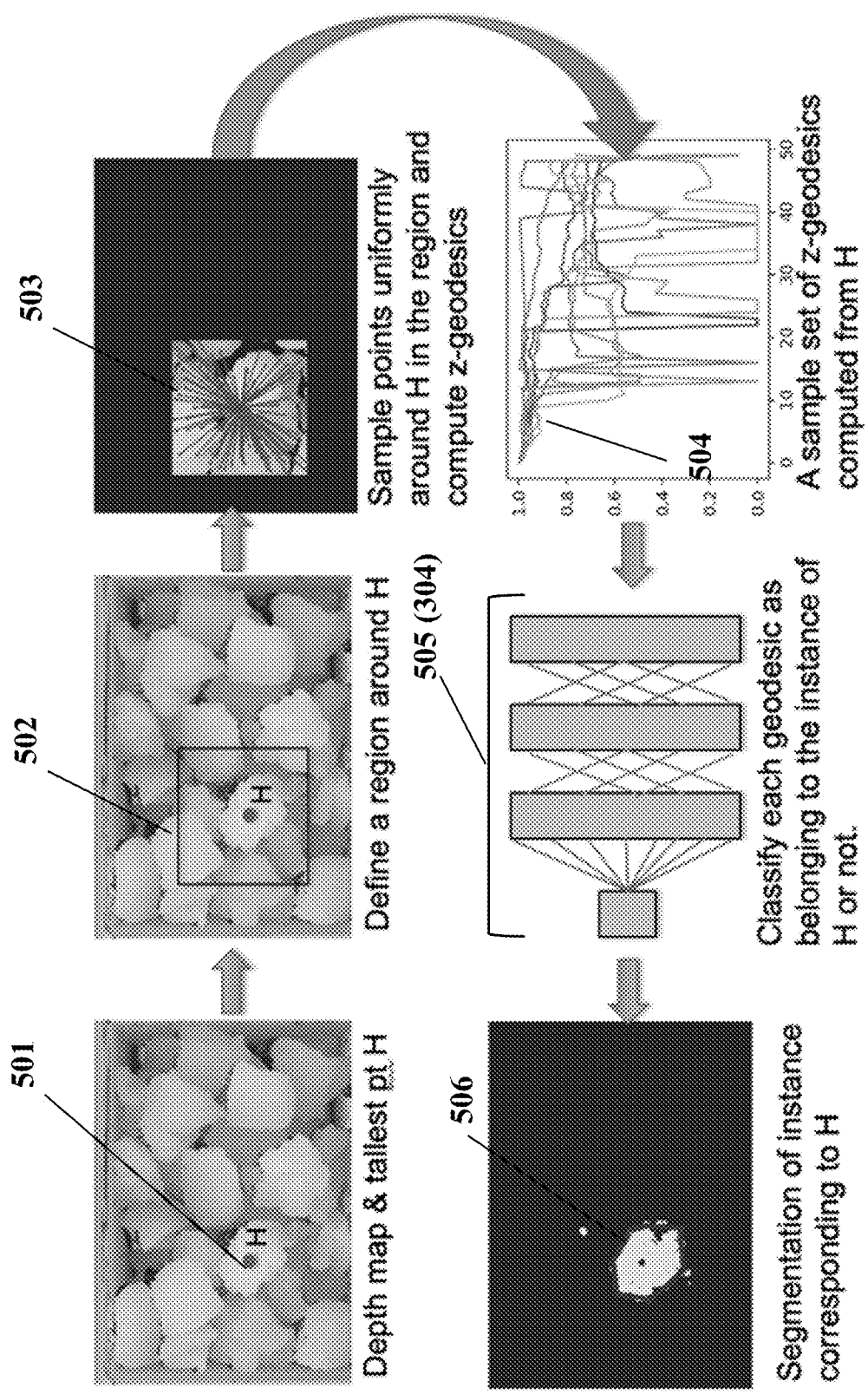
FIG. 5 shows an example of an inference pipeline for segmenting an instance, according to embodiments of the present invention.

FIG. 5 shows an exapmle of an inference pipeline for segmenting an instance, according to some embodiments of the present invention. First, we select a seed point in the test depth image, which corresponds to the tallest point on the pickable instance. Let us call this point H (501). Next, we use an approximate region around H where the instance could be within. We call the radius of this region the pick radius r. The region is a square box 502 centered at H, with a size 2r. Next, we sample m' points $$\{(x_1, y_1), (x_2, y_2), \ldots, (x'_m, y'_m)\}$$

uniformly around H, and create Euclidean geodesics $$\{e_H^{x_i y_i}\}_{i=1}^{m'}$$

(503). These geodesics are then mapped to discretized depth geodesics v (504) and classified using pre-trained $f_\theta$ (neural network 505 corresponding to the trained neural network 304) to signify the other endpoint of v (corresponding to a point $(x_i, y_i)$ around H) is within an instance segment or not. The points that are classified as within a segment are then fed to a robust convex hull computation algorithm to produce a segmentation (506) of the instance. Note that the convexity of the object is thus important for this step to work correctly.

To create a segmentation for a different instance, we select another tall point H' from the depth image such that the pick radius r around H' will not overlap with the pick radius around H. That is, we search for instances whose depth geodesics will not overlap with the instance that we already segmented. Once we find a point H', we apply the procedure described above. We do this process sequentially, generating one instance segment at a time.

Algorithm Extensions
Debiasing the Training Set

As an astute reader might immediately pickout, there is a difference in the way the geodesics are computed at training and at test time. While, the training samples in the above setup were selected at random from the image grid, the test samples are selected from the tallest point in the depth map. Thus, in the latter the initial dimensions (closest to H) in the discretized geodesic v will have a trend of going up (i.e., the depth increasing), however, this need not be the case for those in the training set, creating a bias in the training and test distributions. To mitigate this issue, we sort the training points using their depth values in the ascending order of their depths, and always compute the geodesics during training from points that have a lower depth to points that have a higher depth.

Systematic Sampling of the Test Geodesics

Figures 6A, 6B:
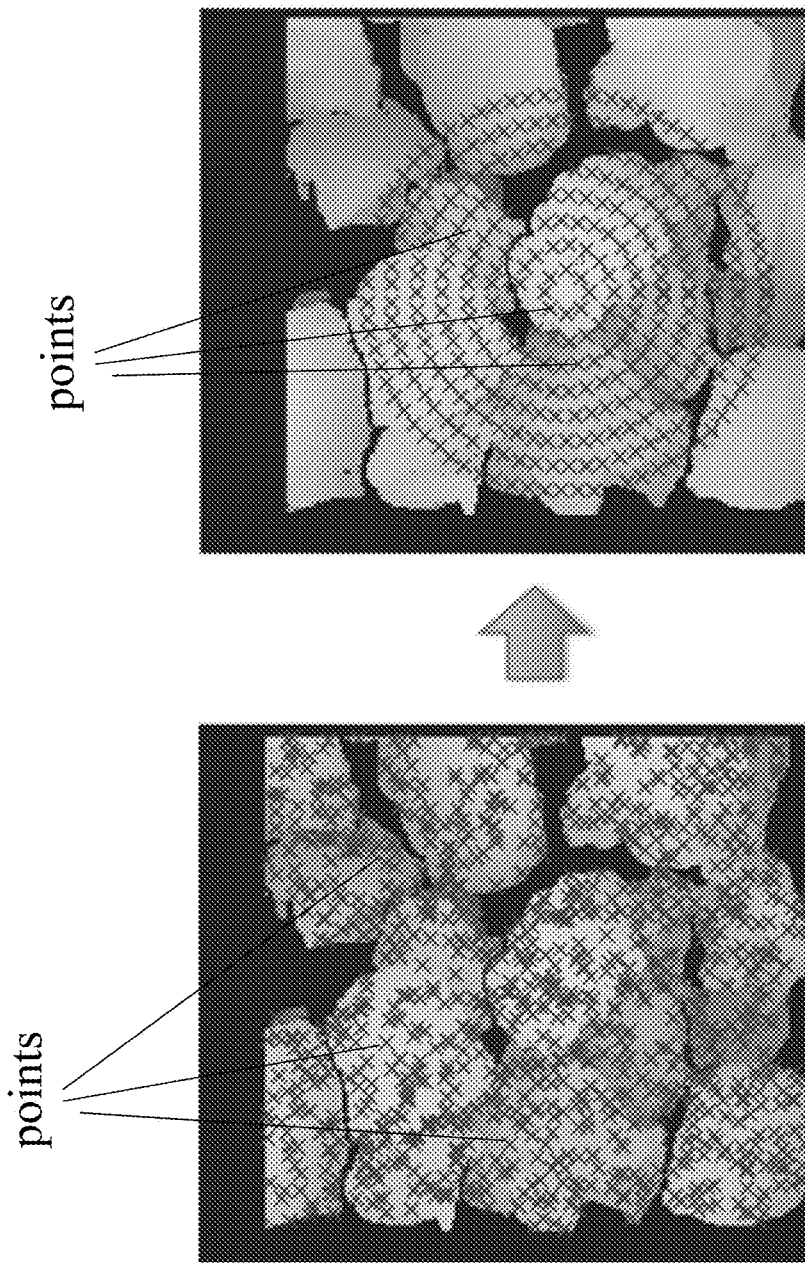
FIG. 6A shows an example illustrating a random selection of points around a pick point for computing the geodesics, according to embodiments of the present invention.
FIG. 6B shows an example illustrating a systematic selection of points around a pick point for computing the geodesics, according to embodiments of the present invention.
Figures 7A, 7B, 7C, 7D:
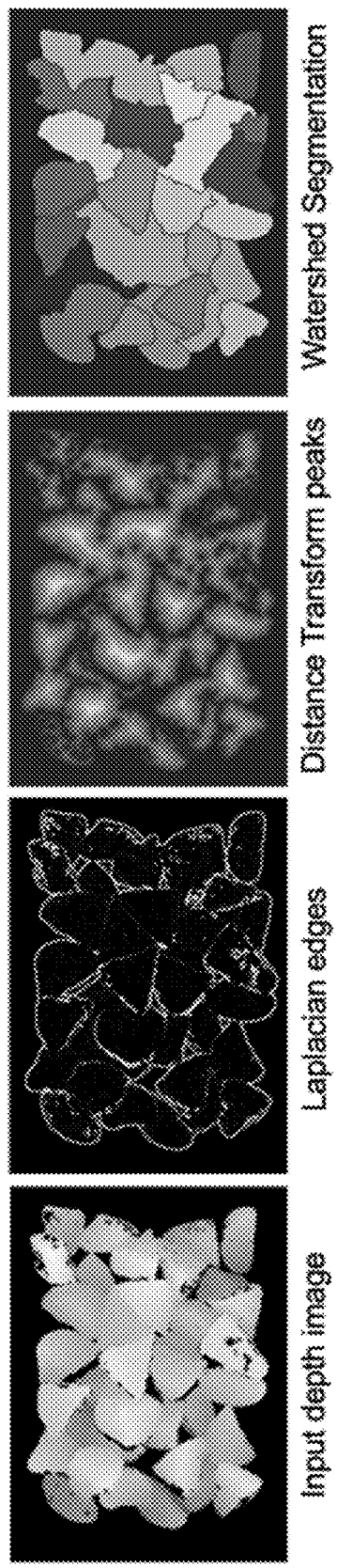
FIGS. 7A, 7B, 7C and 7D show examples of a depth map and the steps based on Watershed Transforms to produce an instance segmentation, according to embodiments of the present invention.

In the basic inference algorithm described above, we randomly sampled the test points around the seed point. However, a more efficient approach would be to select the points systematically. To this end, we propose to use the pick radius r to define a circular region around the pick point H; this region is then divided into equal sectors, by dividing r into β equal parts, and dividing the circle into ζ equal angles. This leads to βζ points to consider for generating the surface geodesics, where these parameters can be adjusted depending on the underlying shape of the segment we ought to learn. FIG. 6A shows an example illustrating a random selection of points around a pick point for computing the geodesics, and FIG. 6B shows an example illustrating a systematic selection of points around a pick point for computing the geodesics according to some embodiments of the present invention.

Watershed Initialization a. So far, we have used randomly sampled points (albeit being sorted) during the training phase. Such a sampling does not distinguish between using easy geodesics against hard geodesics to learn the classifier. For example, a trivial discontinuity may be sufficient for a classifier to flag an out-of-instance trajectory, however, if such discontinuities do not happen, perhaps there are other subtle clues in the geodesic that the classifier should pay attention to? Such attention could be difficult to learn when they might be relatively very less frequent in the deluge of simple trajectories. To this end, we propose a hard-negative mining extension to our basic approach using Watershed Transforms (WT). Watershed algorithm is a classical unsupervised method for image segmentation that uses the analogy of blocking water being poured from a hill top (the interior of an instance) which flows towards the valleys (i.e., segment boundaries). If we block the valleys using "dams" (via characterizing the edges using image Laplacians), then the pixels within which the water gets trapped forms a segment. A challenge with the above approach to work correctly is in the choice of where to construct the dams such that the trapped water corresponds to a ground truth segment.

b. In WT, the points where to start the region growing (i.e., the location to pour the water) are found using distance transforms. That is, first distance transforms are computed on the images to find regions where the peaks are (which corresponds to points that are farthest from the edges), and next these points are selected for region growing. There are two advantages of using this idea in our setup: (i) points that are isolated from other instances could have such a peak, and such isolated instances could be useful for robotic picking, similar to the instance corresponding to the tallest depth point, and (ii) wherever clutter is, i.e., peaks are higher (as the water could not be blocked by the edges due to discontinuous/broken edges), those segments produced by WT might be corresponding to multiple instances being falsely segmented as a single instance by WT, and thus could be useful for our geodesic trajectory based scheme to rectify better, using the provided supervision. Thus, we propose to improve the selection of the seed points to construct the geodesic trajectories via selecting the peaks produced by WT, and confine the end points of the geodesics to be within the segmentation mask produced by WT for that respective peak point. FIGS. 7A, 7B, 7C and 7D show examples of a depth map and the steps based on Watershed Transforms to produce an instance segmentation, according to embodiments of the present invention.

Experiments a. In this section, we provide experiments demonstrating the empirical performance of our method for the task of instance segmentation. For this empirical study, we used a dataset consisting of several pieces of chicken nuggets in a bin. The images were HD quality, however, for our experiments, we resized them to 320×240. We used only a single annotated depth image for training our setup, while the test set consisted of 17 images. The depth images were created using a Ensenso camera. For our systematic sampling of the endpoints, we used a k=14 and the number of angles depended on the pick radius (i.e., $\beta=2\pi r/3$). The pick radius is selected depending on the size of the object to be segmented, e.g., from the average radius of the instances in the provided ground truth segmentations.

b. Neural Network: We used a discretization of the geodesic trajectory with 50 bins and thus we use m=51 bins. Our neural network consisted of 5 MLPs, with respective output dimensions m, 5m, m, m/2, 2, and using ReLU activations, and used Adam for the optimization using the default learning rate and other settings. We also experimented with other non-linear classifier models for the proposed approach (such as a non-linear SVM), the results for which will be presented shortly.

c. Evaluation: For the evaluation of the method, we sampled 1000 points from the ground truth and the predicted instance segment, and computed an F1 score over this overlap whether the classifier predicted these samples correctly. We compute the performance for predicting various number of instance segments in the depth image. One caveat for our sequential way of predicting the segmentations is that sometimes the method will not return the required number of segmentations, as some of the instances would be overlapping with others partially that the exclusion of instances using the pick radius will not be able to find these overlapping instances. Thus, we evaluate only for the instances that had a pick point identified.

Experiments

FIG. 8 shows comparison of results obtained by the present invention and other approaches for Fried Chicken dataset using a neural network against other choices such as Linear SVM, non-linear SVM using an RBF kernel, and a Geodesic K-Means that classifies the discretized trajectories directly using KMeans clustering. The depth images consisted of multiple instances of chicken nuggets. The number of instances varied from 3 to 17. For this experiment, we used 81 K positive trajectories (that is, those with label 1) and 30 K negatives, by sampling the image using the algorithm improvements described in the previous section. To account for the imbalance in the dataset, we used appropriate weights during the training process. As is clear from the table, using our proposed neural variant performs significantly better than other alternatives.

Computational Performance: As our scheme consists of basic computations on the image and depth maps, as well as the trajectories are discretized into small dimensional vectors, our method is computationally very efficient, and takes roughly 5 minutes to train on a 4 core CPU with 100 K trajectories, and takes about 0.05 seconds to segment an instance during inference.

Figure 9:
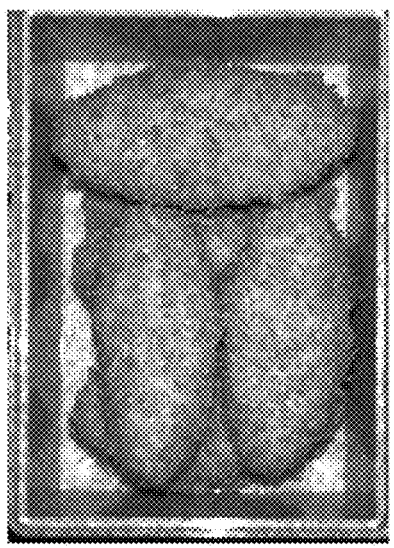
FIG. 9 shows examples of images for the four object classes used for creating the dataset (depth images) in experiments.
Figure 9:
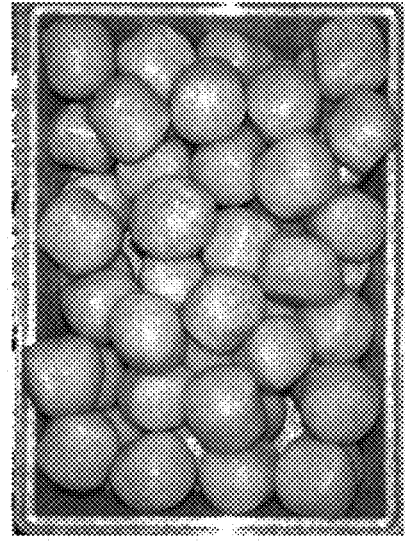
Figure 9:
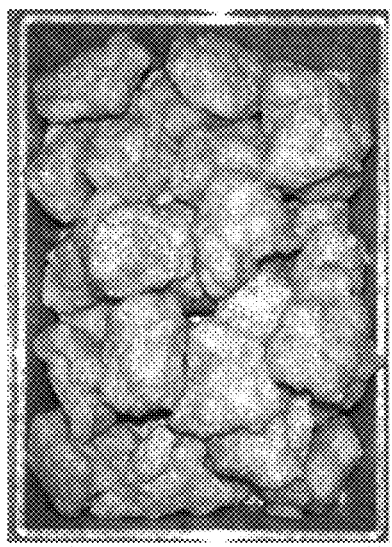
Figure 9:
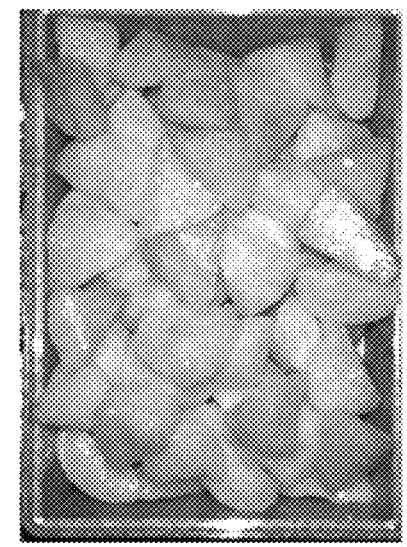
Figure 11A:
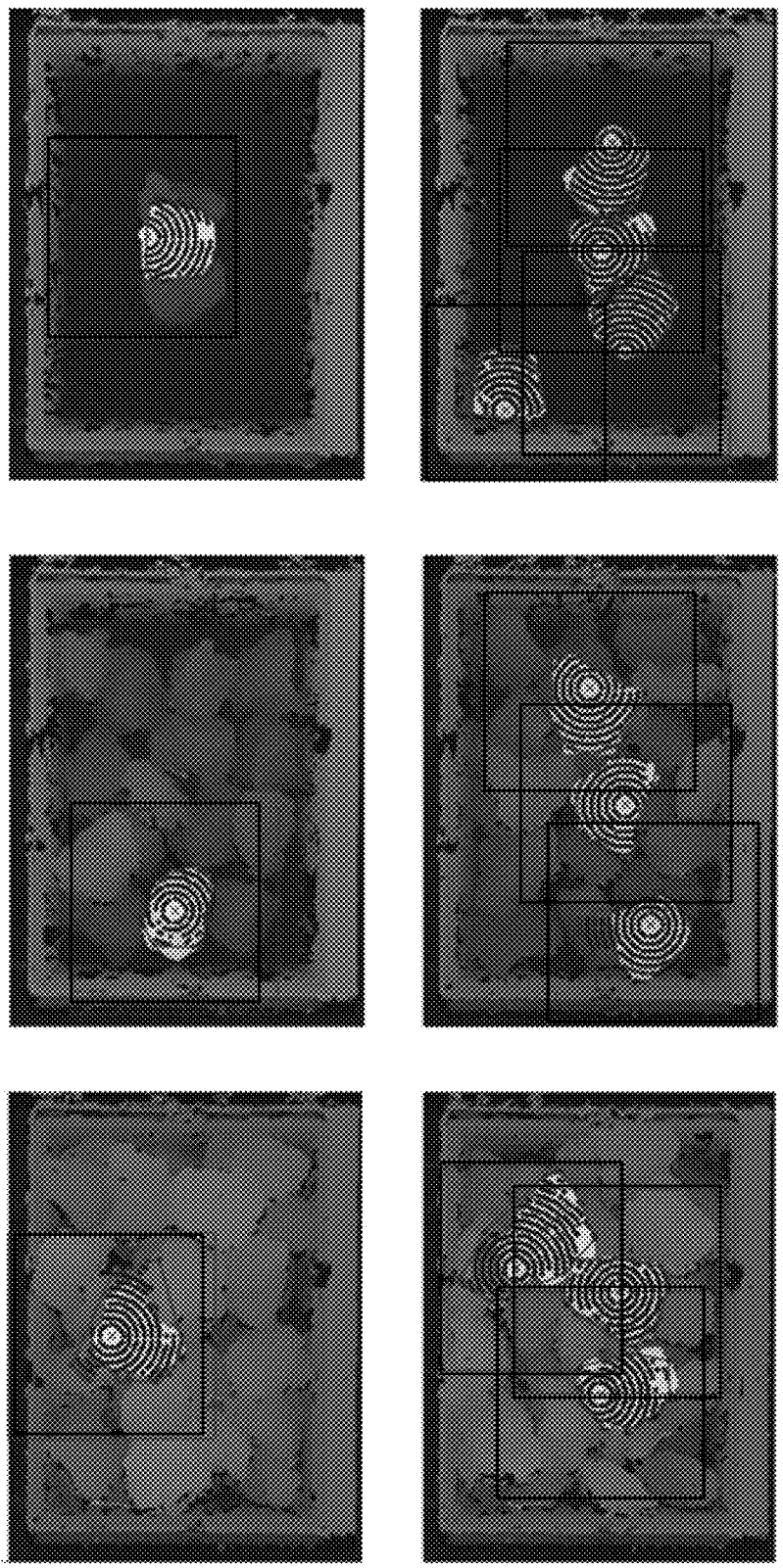
Figure 11B:
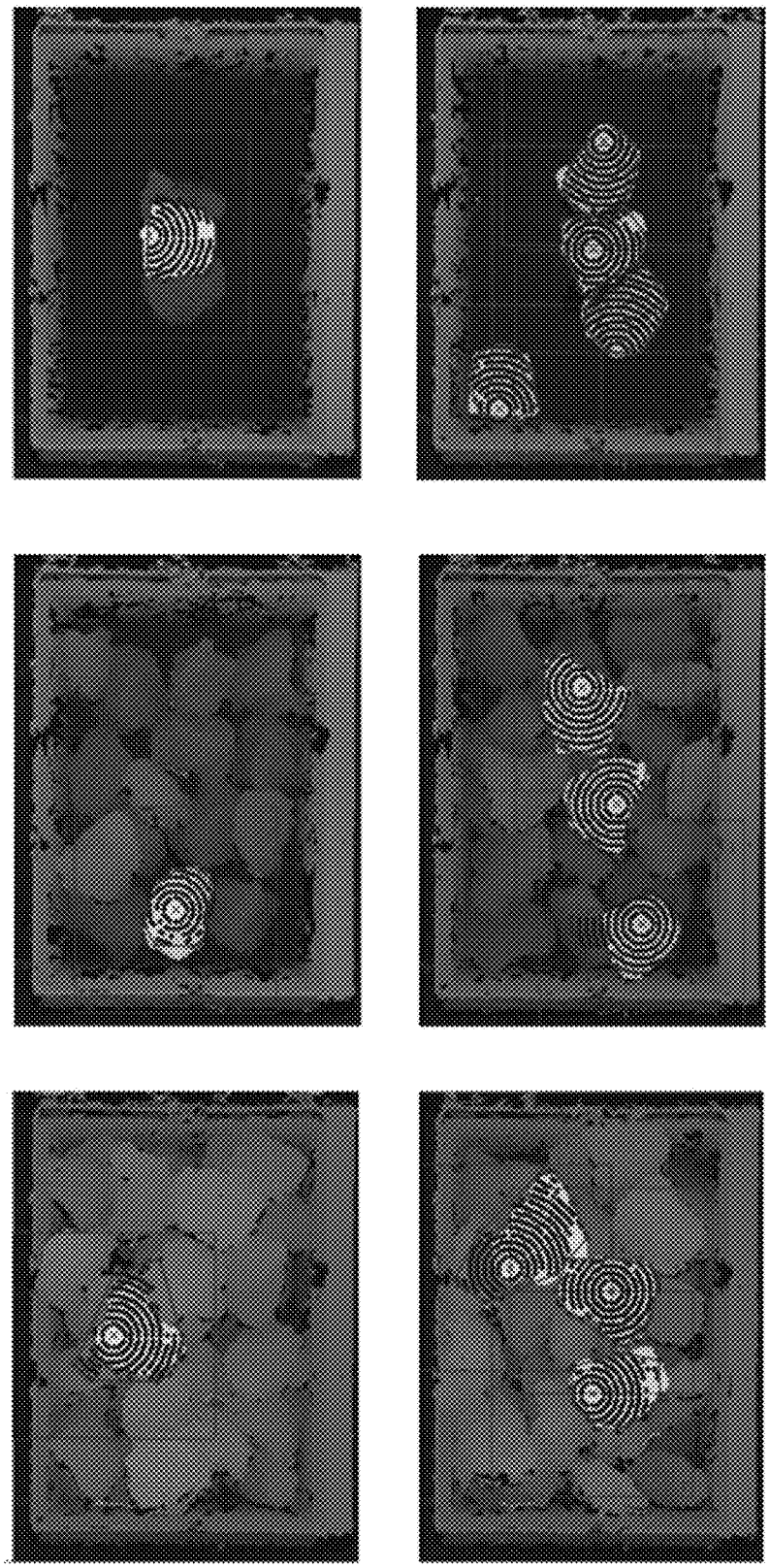
Figure 11C:
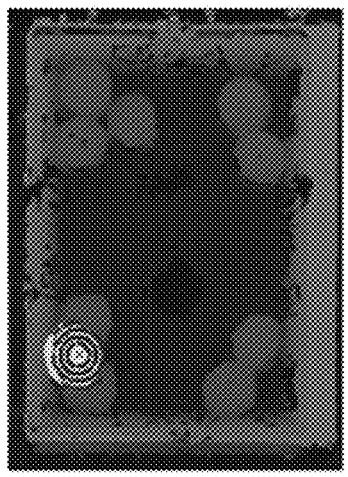
Figure 11C:
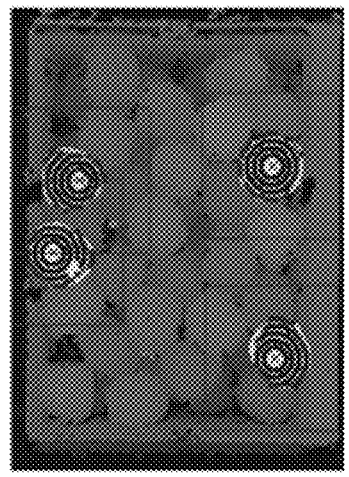
Figure 11C:
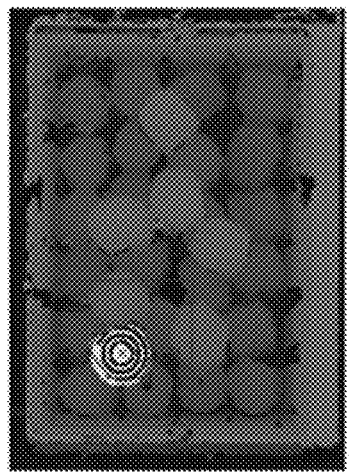
Figure 11C:
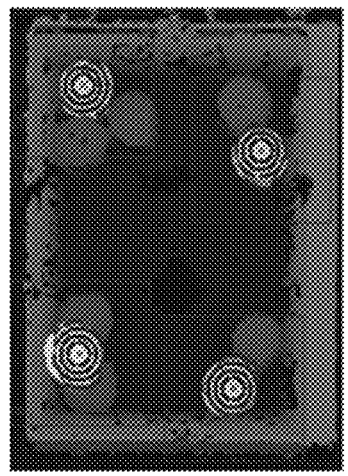
Figure 11C:
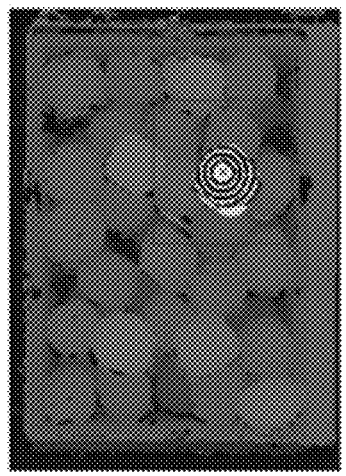
Figure 11C:
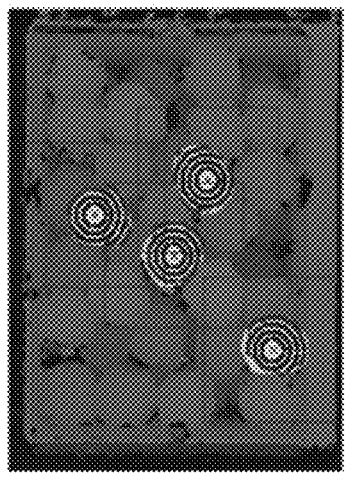

Generalizability:

FIG. 9 shows examples of grayscale images for the four object classes used for creating the dataset (depth images) in experiments. Each depth image consists of multiple instances of the same object, however there are pose variations between the instances, self-occlusions. The object classes correspond to objects of varied shape, size, and number of instances. The following objects are used: (i) a different category of chicken nuggets, (ii) Fried food, (iii) Cut carrots, and (iv) Taro. Chicken nuggets has several instances of fried chicken nuggets, there could be minor shape variations and the shape is not necessarily convex. The Fried food class has only a few instances, however the instances are larger than other shapeas, and is ellipsoidal with a large major axis and a small minor axes, making the geodesics in different directions varied. Cut carrots and Taro classes have small objects, the Taro class has approximately spherical shapes, while the Cut carrots are pyramidal. There is significant inter-object and self occlusions posed by these classes, that makes segmenting the instances in these classes challenging.

FIG. 10 is an exapmle showing the segmentation result using the dataset of FIG. 9 according to some embodiments of the present invention. The Table in FIG. 9 reports the Precision, Recall, and the F1 accuracy score for segmenting single and multiple instances of objects in each of the categories described in FIG. 9 using the method in the present invention. The results show that the method is about 80-90% accurate in segmenting the instances.

Qualitative Segmentation Results

FIGS. 11A, 11B, 11C, and 11D show several examples of segmentations produced by our setup on cut carrots, chicken nuggets, taro, and fried food instances. The FIGS. 11A, 11B, 11C, and 11D show a pickable instance selected for segmentation, this instance is highlighted and its tallest point is marked as 'x'. A square region is selected around the point 'x' as shown by the white square. Depth geodesics are computed from the tallest point 'x' to a systematic set of points around 'x' and inside the square. Those points that are classified as belonging to the same instance are marked by the small black circles. A convex hull is computed on all these black-circled points and they form the instance segmentations. Once a segment is found, that is removed from the depth image, and another point 'x' is selected that is the tallest point in the remaining point cloud, and a region around which will not overlap with any previously selected region by more than 50%, and the process of segmentation is repeated.

Figure 12:
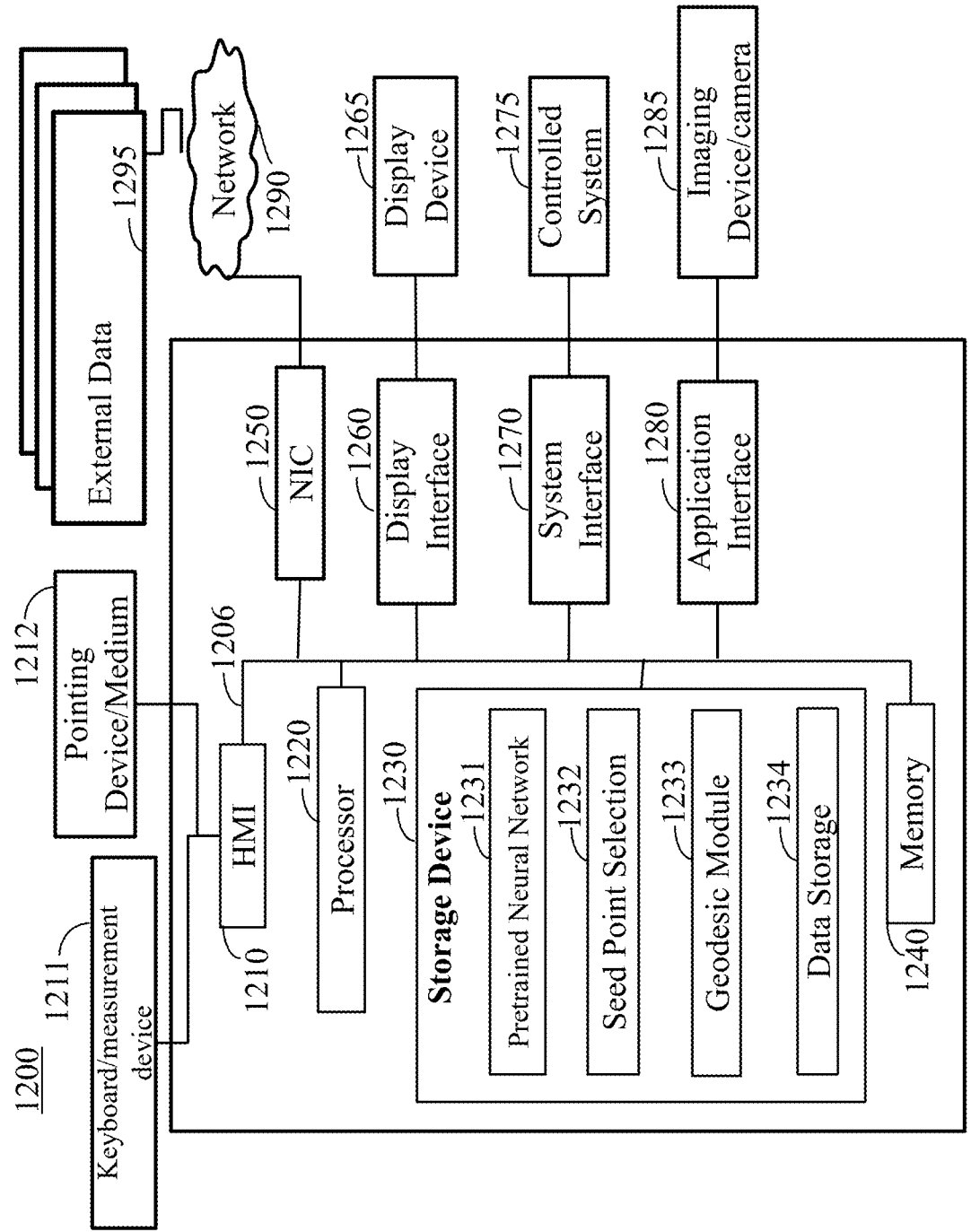
FIG. 12 shows a hardware diagram illustrating some components that may be incorporated in some systems of the present disclosure, according to some embodiments of the present invention.

FIG. 12 shows a hardware diagram illustrating some components that may be incorporated in an imaging controller 1200 of the present disclosure, according to some embodiments of the present disclosure. The imaging controller 1200 can include a processor(s) 1220 configured to execute stored instructions, as well as a memory 1240 that stores instructions that are executable by the processor. The processor 1220 can be a single core processor, a multi-core processor, a computing cluster, or any number of other configurations. The memory 1240 can include random access memory (RAM), read only memory (ROM), flash memory, or any other suitable memory systems. The processor 1220 is connected through a bus 1206 to one or more input and output devices. The imaging controller 1200 can also include a storage device 1230 adapted to store a first module (pretrained Neural Network 1231), a second module (Seed Point Selection program module) 1232, a third module (Geodesic program module) 1233 for storing executable instructions for the processor 1220. In some cases, the modules 1231, 1232 and 1233 can include the architecture of a pretrained image segmentation neural network 505 or 304 shown in FIG. 5 or FIG. 3, a module to select the seed points 301 shown in FIG. 5 or FIG. 3, and a module to create the depth geodesics 303, 504 in FIG. 3 and FIG. 5. The storage device 1230 can store data in data storage 1234. The storage device 1230 can be implemented using a hard drive, an optical drive, a thumb drive, an array of drives, or any combinations thereof.

The imaging controller 1200 can include an input interface to receive depth images from an imaging device including cameras or external data 1295 including a set of training datasets. The input interface can include a human machine interface 1210 within the imaging controller 1200 that connects the processor 1220 to a keyboard/measurement device 1211 and pointing device 1212, wherein the pointing device 1212 can include a mouse, trackball, touchpad, joystick, pointing stick, stylus, or touchscreen, among others. Alternatively, the input interface can include a network interface controller 1250 adapted to connect the imaging controller 1200 through the bus 1206 to a network 1290. Through the network 1290, the external data 1295 can be downloaded and stored within the storage system 1230 as training and/or operating data 1234 for storage and/or further processing.

Still referring to FIG. 12, the imaging controller 1200 can include an output interface linked through the bus 1206, as well as a display interface 1260 adapted to connect the imaging controller 1200 to a display device 1265. Wherein the display device 1265 can include a computer monitor, camera, television, projector, or mobile device, among others. For example, the imaging controller 1200 can be connected to a system interface 1270 adapted to connect a controlled system (robot controller) 1275 or to a different system 1275 controlled based on some aspect. Additionally, or alternatively, the imaging controller 1200 can be connected to an application interface 1280 through the bus adapted to connect the imaging controller 1200 to imaging devices/cameras (depth imaging cameras) 1285 of a robot 150 in FIG. 13. In this case, the imaging controller 1200 is configured to acquire depth images of objects to be manipulated by the robot 150 from imaging devices/cameras 106 (FIG. 13), segment a pickable instance among instances of the objects in the depth image, and generate a geometrical feature of the pickable instance to the controller (manipulator controller) of the robot 150. In some cases, the geometrical feature generated from the segmented instance by the imaging controller 1200 may include the outer sizes of the instance, the pose of the instance, the shape of the instance or the like such that the robot 150 picks the corresponding pickable object from among the objects in the bin or on the workbench.

Figure 13:
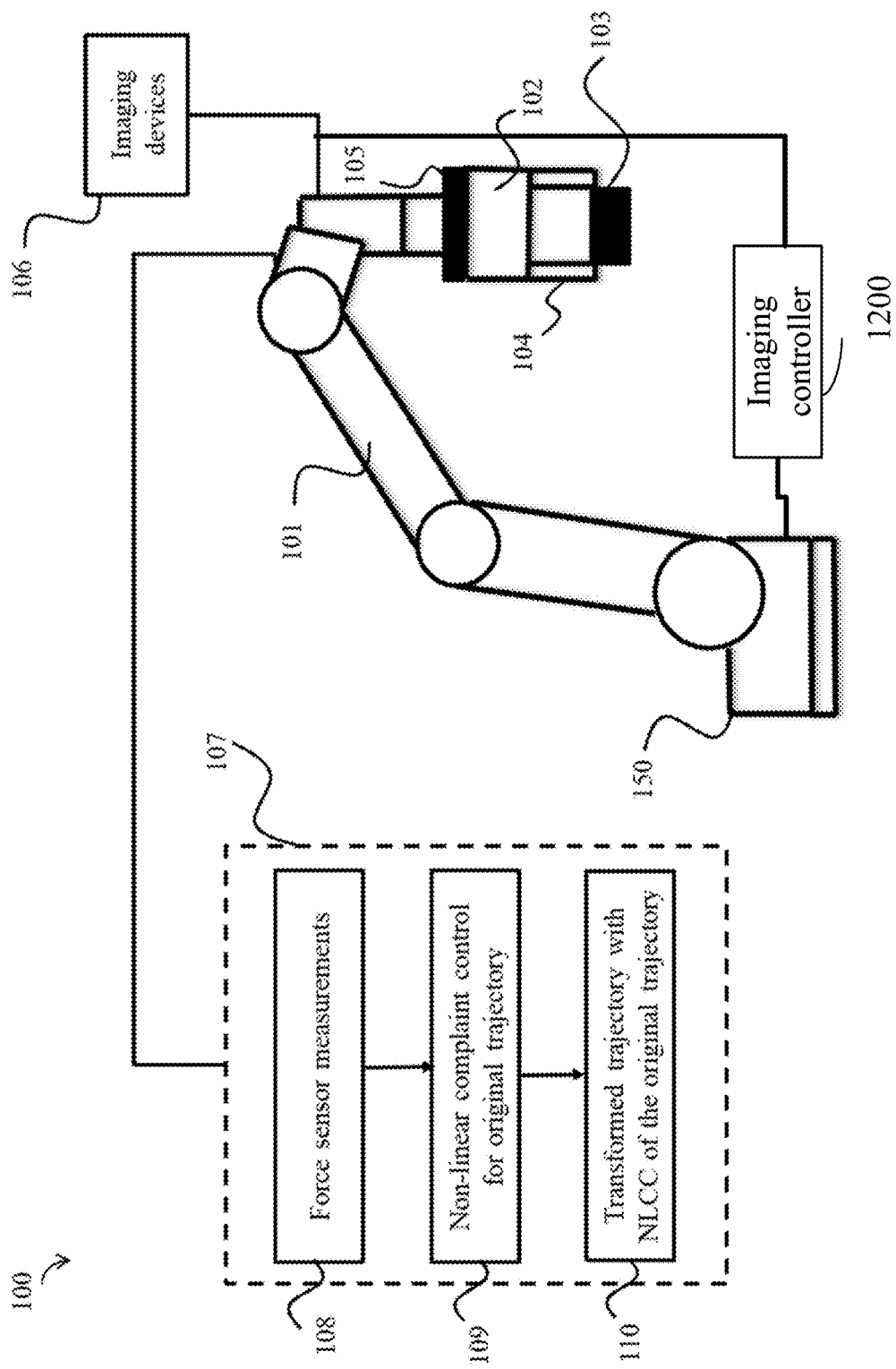
FIG. 13 shows a robotic configuration of a robot, according to embodiments of the present invention.

FIG. 13 shows a robotic configuration 100 of a robot 150, according to some embodiments. The robot 150 includes a controller, a robotic arm 101 for performing an instance picking operation. The robotic arm 101 includes a wrist 102 for ensuring multiple degrees of freedom of moving an object. In some implementations, the wrist 102 is provided with an end-tool 104 for holding an object 103 and/or for performing any other robotic operation, such as a picking operation. The end-tool 104, for example, may be a gripper or other picking tools such as a vacuum tool or the like. Hereinafter, the 'end-tool' may represent 'gripper' or other picking tools such as a vacuum tool or the like or they may be used interchangeably. According to an embodiment, an objective of the picking operation is to pick a single instance of an object, typically an instance closest to the gripper.

The robot 150 is configured to perform the picking operation, e.g., pick the segmented object instance 103, along the trajectory while using imaging devices 106 connected to the imaging controller 1200 that can provide depth images of objects to be manipulated by the robotic arm 101. The imaging controller 1200 is connected to the controller of the robot 150 such that the controller of the robot 150 acquires and uses the features of segmented instances from the imaging controller 1200. As used herein, the trajectory corresponds to a path defining a motion of the object 103 held by the gripper 104, for performing the picking operation. In a simple scenario, the trajectory can dictate only a vertical motion of the wrist 102. However, as the wrist 102 includes multiple degrees of freedom, the trajectory may comprise a motion profile spanning in multi-dimensional space.

A pose of an object refers to a combination of a position and an orientation of the object. The gripper 104 is movable, in a start pose 111. A pose of the gripper 104 corresponding to the start pose 111 is referred to as a start pose of the gripper 104. According to an embodiment, aim of the picking operation is to pick a segmented instance object 103. The pose 115 of the object 112 may refer to a position and/or orientation of the object 112. The robot 150 is configured to move the gripper 104 along a trajectory 113 to pick the object 103 in a pose 114. The pose 114 of the object 103 of the object 112 is referred to as a goal pose. A pose of the gripper 104 corresponding to the goal pose is referred to as a goal pose of the gripper 104.

The goal pose of the gripper 104 is determined based on a position of the object 112. At the end of a successful execution of the picking operation, the pose of the gripper 104 of the robot arm 101 is considered to have attained the goal pose of the gripper 104. Therefore, achieving the goal pose of the gripper 104 is equivalent to the successful execution of the picking operation. According to an embodiment, the trajectory 113 is defined according to the start pose and goal pose of the gripper 104, and the pose 115 of the object 112. Further, such picking operation may be executed repeatedly by the robot 150.

Figure 14:
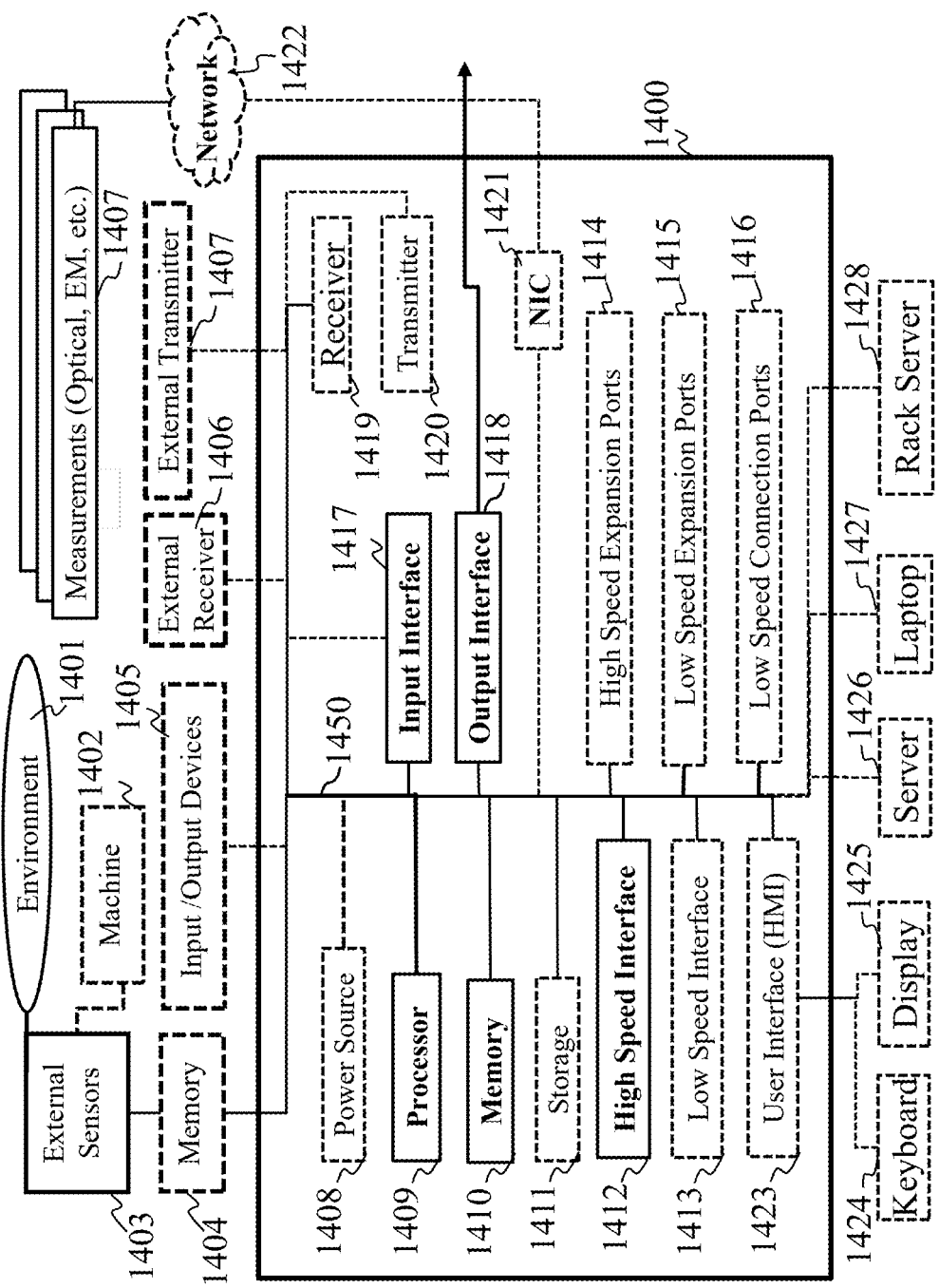
FIG. 14 is a schematic illustrating by non-limiting example a computing apparatus that can be used to implement some techniques, according to embodiments of the present invention.

FIG. 14 is a schematic illustrating by non-limiting example a computing apparatus 1400 that can be used to implement some techniques of the methods and systems, according to embodiments of the present disclosure. The computing apparatus or device 1400 represents various forms of digital computers, such as laptops, desktops, workstations, personal digital assistants, servers, blade servers, mainframes, and other appropriate computers. The computing device 1400 can include a power source 1408, a processor 1409, a memory 1410, a storage device 1411, all connected to a bus 1450. In some cases, the storage device 1411 can include the architecture of trained neural network 505 (304, 1231) based on the training pipeline shown in FIG. 3. Further, the architecture of trained neural network may be obtained, via the network, from an external data 1395 that stores trained neural networks. Further, a high-speed interface 1412, a low-speed interface 1413, high-speed expansion ports 1414 and low speed connection ports 1415, can be connected to the bus 1450. Also, a low-speed expansion port 1416 is in connection with the bus 1450.

Contemplated are various component configurations that may be mounted on a common motherboard, by non-limiting example, 1430, depending upon the specific application. Further still, an input interface 1417 can be connected via bus 1450 to an external receiver 1406 and an output interface 1418. A receiver 1419 can be connected to an external transmitter 1407 and a transmitter 1420 via the bus 1450. Also connected to the bus 1450 can be an external memory 1404, external sensors 1403, machine(s) 1402 and an environment 1401. Further, one or more external input/output devices 1405 can be connected to the bus 1450. A network interface controller (NIC) 1421 can be adapted to connect through the bus 1450 to a network 1422, wherein data or other data, among other things, can be rendered on a third-party display device, third-party imaging device, and/or third-party printing device outside of the computer device 1400.

Still referring to FIG. 14, also contemplated is that the memory 1410 can store instructions that are executable by the computer device 1400, historical data, and any data that can be utilized by the methods and systems of the present disclosure. The memory 1410 can include random access memory (RAM), read only memory (ROM), flash memory, or any other suitable memory systems. The memory 1410 can be a volatile memory unit or units, and/or a non-volatile memory unit or units. The memory 1410 may also be another form of computer-readable medium, such as a magnetic or optical disk.

Still referring to FIG. 14, a storage device 1411 can be adapted to store supplementary data and/or software modules used by the computer device 1400. For example, the storage device 1411 can store historical data and other related data as mentioned above regarding the present disclosure. Additionally, or alternatively, the storage device 1411 can store historical data similar to data as mentioned above regarding the present disclosure. The storage device 1411 can include a hard drive, an optical drive, a thumb-drive, an array of drives, or any combinations thereof. Further, the storage device 1411 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1409), perform one or more methods, such as those described above. The system can be linked through the bus 1450 optionally to a display interface or user Interface (HMI) 1423 adapted to connect the system to a display device 1425 and keyboard 1424, wherein the display device 1425 can include a computer monitor, camera, television, projector, or mobile device, among others.

Still referring to FIG. 14, the computer device 1400 can include a user input interface 1417 adapted to a printer interface (not shown) can also be connected through bus 1450 and adapted to connect to a printing device (not shown), wherein the printing device can include a liquid inkjet printer, solid ink printer, large-scale commercial printer, thermal printer, UV printer, or dye-sublimation printer, among others. The high-speed interface 1412 manages bandwidth-intensive operations for the computing device 1400, while the low-speed interface 1413 manages lower bandwidth-intensive operations. Such allocation of functions is an example only. In some implementations, the high-speed interface 1412 can be coupled to the memory 1410, a user interface (HMI) 1423, and to a keyboard 1424 and display 1425 (e.g., through a graphics processor or accelerator), and to the high-speed expansion ports 1414, which may accept various expansion cards (not shown) via bus 1450. In the implementation, the low-speed interface 1413 is coupled to the storage device 1411 and the low-speed expansion port 1415, via bus 1450. The low-speed expansion port 1415, which may include various communication ports (e.g., USB, Bluetooth, Ethernet, wireless Ethernet) may be coupled to one or more input/output devices 1405, and other devices a keyboard 1424, a pointing device (not shown), a scanner (not shown), or a networking device such as a switch or router, e.g., through a network adapter.

Still referring to FIG. 14, the computing device 1400 may be implemented in a number of different forms, as shown in the figure. For example, it may be implemented as a standard server 1426, or multiple times in a group of such servers. In addition, it may be implemented in a personal computer such as a laptop computer 1427. It may also be implemented as part of a rack server system 1428. Alternatively, components from the computing device 1400 may be combined with other components such as the embodiment of FIG. 13. Each of such devices may contain one or more of the computing device 1300 and the device 1400, and an entire system may be made up of multiple computing devices communicating with each other.

Although the robotic system described above expresses, as an example, a robot that can manipulate/assemble parts of a product, the robot system can be applied to a robot that can be applied to a case where lot of foods in food processing plants are irregularly shaped objects (cut vegetables, fried chickens, etc.). The robotic system that includes a system for generating verisimilar images from real depth images and automatically segmenting multiple instances of a rigid object in depth images can be applied to the automation of food processing plants, industrial robots which can manipulate foods. Further, the robotic system described above can be applied to a segmentation (method) system for food recognition. Segmentation is one of the most popular and important problems in the image processing. It's essential to make accuracy of segmentation high and both training and computation time short for applying to food processing plants.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An imaging controller for segmenting instances from depth images including objects to be manipulated by a robot comprising:
    an input interface configured to receive a depth image that includes objects;
    a memory configured to store instructions and a neural network trained to segment instances from the objects in the depth image; and
    a processor, coupled with the memory, configured to perform the instructions to segment a pickable instance using the trained neural network, wherein steps of the instructions comprise:

selecting a tallest point in the depth image;
defining a region using a shape such that the region surrounds the tallest point;
sampling points in the region of the depth image;
computing depth-geodesics between the tallest point and the sampled points;
submitting the depth-geodesics to the neural network to segment the pickable instance among instances of the objects in the depth image; and
an output interface configured to output a geometrical feature of the pickable instance to a manipulator controller of the robot.

2. The imaging controller of claim 1, wherein the depth images are acquired by a camera or sensor.

3. The imaging controller of claim 1, wherein the steps further comprises:
selecting a next tallest point from the depth images such that a pick radius around the next tallest point excludes an overlap with the pickable instance;
defining a next region using the shape such that the next region surrounds the next tallest point;
sampling next points in the next region of the depth image;
computing next depth-geodesics between the next tallest point and the sampled next points; and
submitting the depth-geodesics to the neural network to segment a next pickable instance among the instances of the objects in the depth image.

4. The imaging controller of claim 3, wherein the steps of selecting, defining, the sampling, computing and submitting are continued until the steps are performed to a rest of the objects in the depth image.

5. The imaging controller of claim 1, wherein the shape is a square, a rectangular, a triangle, a circle or an oval.

6. The imaging controller of claim 1, wherein the neural network is trained to classify each feature vector as belonging to an identical instance or different instance.

7. The imaging controller of claim 1, wherein end-points of the geodesics are initialized using peaks produced by a Watershed Algorithm.

8. A computer-implemented method for training a neural network for segmenting instances in depth images, wherein the method uses a processor coupled with stored instructions implementing the method, wherein the instructions, when executed by the processor carry out at steps of the method, comprising steps of:
selecting a depth image from a set of depth images;
determining points of xy-locations on a 2-dimensional image grid and corresponding depth points with respect to the selected depth image, wherein the points on the 2-dimensional image grid are respectively annotated with ground truth instance labels;
computing geodesic straight lines between pairs of the annotated determined points;
generating depth geodesics by projecting the geodesic straight lines on the depth image;
discretizing each of the depth geodesics to create discretized vectors, wherein each discretized vector corresponds to one of the depth geodesics between a pair of the annotated determined points; and
submitting the discretized vectors and corresponding annotated labels of the discretized vectors to the neural network, wherein the steps from the selecting through the providing are repeatedly performed until a rest of all the set of depth images are used.

9. The method of claim 8, wherein the neural network is trained to classify each feature vector as belonging to an identical instance or different instance.

10. The method of claim 9, further comprises computing a convex hull of all endpoints of the geodesics that are classified as the geodesics belonging to the identical instance as a pickable point.

11. The method of claim 8, wherein the generated depth geodesics are debiased such that the geodesics are created from points being lower-depth to points being higher depth.

12. The method of claim 8, wherein end-points of the geodesics are initialized using peaks produced by a Watershed Algorithm.

13. The method of claim 12, wherein the endpoints of the geodesic are determined using a systematic selection method.

14. A bin-picking system for picking objects from a bin, comprising:
an end-tool configured to pickup an object from among the objects;
a robot arm including the end-tool, wherein the robot arm is configured to be driven by control signals that include end-tool signals to pickup the object from the bin using the end-tool;
an interface configured to transmit and receive the control signals, sensor signals of sensors arranged on the robot arm, imaging signals of at least one imaging device;
a memory configured to store instructions of a robot control program, and a classifier and a trained neural network that segments instances from the objects in the depth image, the trained neural network having been trained by a computer-implemented method of claim 8; and
a processor, coupled with the memory, configured to perform the instructions to segment a pickable instance using the trained neural network and generate the control signals that drive the robot arm and the end-tool, wherein steps of the instructions comprise:
selecting a tallest point in the depth image;
defining a region using a shape such that the region surrounds the tallest point;
sampling points in the region of the depth image;
computing depth-geodesics between the tallest point and the sampled points;
submitting the depth-geodesics to the neural network to segment the pickable instance among instances of the objects in the depth image;
generating a geometrical feature of the pickable instance and the control signals based on the imaging signals; and
transmitting the generated geometrical feature and generated control signals to the robot arm such that the end-tool pickups the object corresponding to the pickable instance from the bin using the end-tool.

15. The bin-picking system of claim 14, wherein the depth images are acquired by a camera or sensor.

16. The bin-picking system of claim 14, wherein the steps further comprises:
selecting a next tallest point from the depth images such that a pick radius around the next tallest point excludes an overlap with the pickable instance;
defining a next region using the shape such that the next region surrounds the next tallest point;
sampling next points in the next region of the depth image;
computing next depth-geodesics between the next tallest point and the sampled next points; and submitting the depth-geodesics to the neural network to segment a next pickable instance among the instances of the objects in the depth image.

17. The bin-picking system of claim 16, wherein the steps of selecting, defining, the sampling, computing and submitting are continued until the steps are performed to a rest of the objects in the depth image.

18. The bin-picking system of claim 14, wherein the shape of the region is a square, a rectangular, a triable, a circle or an oval.

19. The bin-picking system of claim 14, wherein the neural network is trained to classify each feature vector as belonging to an identical instance or different instance.

20. The bin-picking system of claim 14, wherein endpoints of the geodesics are initialized using peaks produced by a Watershed Algorithm.

* * * * *